United States Patent
Wendland et al.

(10) Patent No.: US 10,434,493 B2
(45) Date of Patent: Oct. 8, 2019

(54) METAL-CONTAINING SORBENTS FOR NITROGEN-CONTAINING COMPOUNDS

(71) Applicant: 3M INNOVATIVE PROPERTIES COMPANY, St. Paul, MN (US)

(72) Inventors: Michael S. Wendland, North St. Paul, MN (US); Brett A. Beiermann, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 15/781,518

(22) PCT Filed: Dec. 15, 2016

(86) PCT No.: PCT/US2016/066835
§ 371 (c)(1),
(2) Date: Jun. 5, 2018

(87) PCT Pub. No.: WO2017/106448
PCT Pub. Date: Jun. 22, 2017

(65) Prior Publication Data
US 2018/0353933 A1    Dec. 13, 2018

Related U.S. Application Data

(60) Provisional application No. 62/269,647, filed on Dec. 18, 2015.

(51) Int. Cl.
*B01J 20/10* (2006.01)
*B01J 20/22* (2006.01)
(Continued)

(52) U.S. Cl.
CPC ......... *B01J 20/103* (2013.01); *B01J 20/0237* (2013.01); *B01J 20/0244* (2013.01);
(Continued)

(58) Field of Classification Search
CPC .. B01J 20/103; B01J 20/0237; B01J 20/0244; B01J 20/223; B01J 20/28083;
(Continued)

(56) References Cited

U.S. PATENT DOCUMENTS 3,347,935 A    10/1967  Kaupp
3,692,884 A     9/1972  Gaskell
(Continued)

FOREIGN PATENT DOCUMENTS

CN    103894154 A  *  7/2014  ............. B10J 20/22
DE    4428645         2/1995
(Continued)

OTHER PUBLICATIONS

Alothman, "A Review: Fundamental Aspects of Silicate Mesoporous Materials", Materials, 2012, vol. 5, No. 12, pp. 2874-2902.
(Continued)

*Primary Examiner* — Melvin C. Mayes
*Assistant Examiner* — Michael Forrest
(74) *Attorney, Agent, or Firm* — Jean A. Lown

(57) ABSTRACT

Metal-containing sorbent materials are provided, methods of making the metal-containing sorbent materials, methods of using the metal-containing sorbent materials, and metal complex-containing composite materials resulting from the sorption of basic, nitrogen-containing compounds on the metal-containing sorbent materials are provided. The sorbent materials are prepared by incorporating divalent metals into a precursor material that is formed by treating a porous siliceous material having mesopores with a silane or disilazane surface treatment agent. The metal-containing sorbent materials can be used to capture basic, nitrogen-containing compounds having a molecular weight no greater than 150 grams/mole.

15 Claims, 2 Drawing Sheets

US 10,434,493 B2
Page 2

(51) Int. Cl.
*B01J 20/32* (2006.01)
*B01J 20/28* (2006.01)
*B01J 20/02* (2006.01)

(52) U.S. Cl.
CPC ....... *B01J 20/223* (2013.01); *B01J 20/28083* (2013.01); *B01J 20/3204* (2013.01); *B01J 20/3257* (2013.01); *B01J 20/3265* (2013.01); *B01J 20/3285* (2013.01); *B01D 2253/25* (2013.01); *B01D 2257/40* (2013.01); *B01D 2257/406* (2013.01)

(58) Field of Classification Search
CPC ................ B01J 20/3204; B01J 20/3257; B01J 20/3265; B01J 20/3285
See application file for complete search history.

(56) References Cited

U.S. PATENT DOCUMENTS

| | | |
|---|---|---|
| 3,976,606 A | 8/1976 | Gobran |
| 4,181,752 A | 1/1980 | Martens |
| 4,374,883 A | 2/1983 | Winslow |
| 4,677,096 A | 6/1987 | Van Der Smissen |
| 4,798,201 A | 1/1989 | Rawlings |
| 5,164,441 A | 11/1992 | Yang |
| 5,216,050 A | 6/1993 | Sinclair |
| 5,223,465 A | 6/1993 | Ueki |
| 5,290,615 A | 3/1994 | Tushaus |
| RE34,605 E | 5/1994 | Schrenk |
| 5,360,659 A | 11/1994 | Arends |
| 5,387,623 A | 2/1995 | Ryan |
| 5,457,175 A | 10/1995 | Scharrer |
| 5,579,162 A | 11/1996 | Bjornard |
| 5,623,011 A | 4/1997 | Bernard |
| 5,695,837 A | 12/1997 | Everaerts |
| 5,726,220 A | 3/1998 | Tokushige |
| 5,804,610 A | 9/1998 | Hamer |
| 5,882,774 A | 3/1999 | Jonza |
| 6,048,611 A | 4/2000 | Lu |
| 6,049,419 A | 4/2000 | Wheatley |
| 6,160,083 A | 12/2000 | Thompson |
| 6,294,249 B1 | 9/2001 | Hamer |
| 6,489,392 B1 | 12/2002 | Lappalainen |
| 6,710,128 B1 | 3/2004 | Helmer |
| 6,930,219 B2 | 8/2005 | Shan |
| 7,008,987 B2 | 3/2006 | Okada |
| 7,294,861 B2 | 11/2007 | Schardt |
| 7,559,981 B2 | 7/2009 | Friday |
| 8,124,169 B2 | 2/2012 | Ylitalo |
| 8,450,420 B2 | 5/2013 | Sakurai |
| 8,742,022 B2 | 6/2014 | Pokorny |
| 9,828,530 B2 | 11/2017 | Ali |
| 2007/0092733 A1 | 4/2007 | Yang |
| 2007/0179218 A1 | 8/2007 | Brake |
| 2007/0276090 A1 | 11/2007 | Aoki |
| 2008/0199704 A1 | 8/2008 | Ho |
| 2009/0018237 A1 | 1/2009 | Fujii |
| 2009/0087629 A1 | 4/2009 | Everaerts |
| 2010/0086705 A1 | 4/2010 | Everaerts |
| 2012/0015002 A1 | 1/2012 | Ali |
| 2012/0270978 A1 | 10/2012 | Myers |
| 2012/0328808 A1 | 12/2012 | Mehlmann |
| 2014/0130827 A1 | 5/2014 | Dotterman |
| 2014/0138131 A1 | 5/2014 | Hao |
| 2014/0170362 A1 | 6/2014 | Ali |
| 2014/0186250 A1 | 7/2014 | Levan |
| 2015/0024019 A1 | 1/2015 | Ali |
| 2015/0035204 A1 | 2/2015 | Stoner |
| 2015/0140329 A1 | 5/2015 | Tanrikulu |
| 2015/0175812 A1 | 6/2015 | Ali |
| 2015/0293028 A1 | 10/2015 | Kang |
| 2018/0105628 A1 | 4/2018 | Wendland |

FOREIGN PATENT DOCUMENTS

| | | |
|---|---|---|
| EP | 0624392 | 11/1994 |
| EP | 2078696 | 7/2009 |
| JP | 2003-286401 | 10/2003 |
| JP | 2004-010842 | 1/2004 |
| JP | 4223269 | 6/2004 |
| JP | 2011-006615 | 1/2011 |
| WO | 97/33945 | 9/1997 |
| WO | 03/095514 | 11/2003 |
| WO | 2006/103754 | 10/2006 |
| WO | 2008/043716 | 4/2008 |
| WO | 2014/018817 | 1/2014 |
| WO | 2014/078088 | 5/2014 |
| WO | 2014/093375 | 6/2014 |
| WO | 2014/105584 | 7/2014 |
| WO | 2015/157612 | 10/2015 |
| WO | 2015/157615 | 10/2015 |
| WO | 2015/195602 | 12/2015 |
| WO | 2015/195616 | 12/2015 |
| WO | 2015/195617 | 12/2015 |
| WO | 2016/105998 | 6/2016 |
| WO | 2016/109176 | 7/2016 |
| WO | 2017/106443 | 6/2017 |
| WO | 2017/112386 | 6/2017 |
| WO | 2017/112450 | 6/2017 |
| WO | 2018/102267 | 6/2018 |

OTHER PUBLICATIONS

Alslaibi, "A review: production of activated carbon from agricultural byproducts via conventional and microwave heating", Journal of Chemical Technology and Biotechnology, 2013, vol. 88, pp. 1183-1190.
Barrer, "Molecular Diffusion in Chabazite, Mordenite and Levynite", Transactions of the Faraday Society, 1953, vol. 49, pp. 1049-1059.
Boettcher, "Silica Sol-Gel Glasses with Embedded Organic Liquids", Advanced Materials, 1999, vol. 11, No. 2, pp. 138-141.
Eguiburu, "Blends of amorphous and crystalline polylactides with poly(methyl methacrylate) and poly(methyl acrylate): a miscibility study", Polymer, 1998, vol. 39, No. 26, pp. 6891-6897.
Gajria, "Miscibility and biodegradability of blends of poly(lactic acid) and poly(vinyl acetate)", Polymer, 1996, vol. 37, No. 3, pp. 437-444.
Hao, "Thermal and Mechanical Properties of Polylactide Toughened with a Butyl Acrylate-Ethyl Acrylate-Glycidyl Methacrylate Copolymer", Chinese Journal of Polymer Science, 2013, vol. 31, No. 11, pp. 1519-1527.
Meng, "Transparent and ductile poly(lactic acid)/poly(butyl acrylate) (PBA) blends: Structure and properties", European Polymer Journal, 2012, vol. 48, pp. 127-135.
Niu, "Highly dispersed Ru on K-doped meso-macroporous $SiO_2$ for the preferential oxidation of CO in $H_2$-rich gasses", International Journal of Hydrogen Energy, 2014, vol. 39, pp. 13800-13807.
Song, "Coordination of Metal Cations with Amino-Functionalized MCM-41 for Adsorptive Desulfurization", Advanced Materials Research, May 2014, vols. 926-930, pp. 4222-4225.
Temel, "Photopolymerization and photophysical properties of amine linked benzophenone photoinitiator for free radical polymerization", Journal of Photochemistry and Photobiology A: Chemistry, 2011, vol. 219, No. 1, pp. 26-31.
Yang, "A Pervaporation Study of Ammonia Solutions Using Molecular Sieve Silica Membranes", Membranes, 2014, vol. 4, pp. 40-54.
International Search Report for PCT International Application No. PCT/US2016/066835, dated Apr. 5, 2017, 4 pages.

* cited by examiner

METAL-CONTAINING SORBENTS FOR NITROGEN-CONTAINING COMPOUNDS

CROSS REFERENCE TO RELATED APPLICATIONS

This application is a national stage filing under 35 U.S.C. 371 of PCT/US2016/066835, filed Dec. 15, 2016, which claims the benefit of U.S. Provisional Application No. 62/269,647, filed Dec. 18, 2015, the disclosure of which is incorporated by reference in its/their entirety herein.

TECHNICAL FIELD

Metal-containing sorbent materials, methods of preparing the metal-containing sorbent materials, methods of sorbing basic, nitrogen-containing compounds on the metal-containing sorbent materials, and composite materials resulting from sorbing basic, nitrogen-containing compounds on the metal-containing sorbent materials are described.

BACKGROUND

Ammonia is a commonly used chemical and is present in many different environments. For example, ammonia is present at various manufacturing sites for use in a wide range of chemical reactions, on farms where anhydrous ammonia is used as a fertilizer or where animal excrement is present but ventilation may be inadequate, or in offices and homes from the use of ammonia-containing cleansers.

Ammonia vapors can pose a significant health risk. For example, in the United States, OSHA has set an eight hour exposure limit of 25 parts per million for ammonia vapor and NIOSH recently lowered the IDLH (immediately dangerous to life and health) level from 500 parts per million to 300 parts per million. That is, exposure to ammonia vapor at concentrations greater than 300 parts per million for 30 minutes can result in death or irreversible damage to health.

Because of both the prevalence and potential health risks of ammonia, various respiratory products have been developed to reduce exposure to this compound and to other volatile nitrogen-containing compounds such as amines. These respiratory products typically contain a sorbent that can capture ammonia or volatile amines and thereby remove them from the air. Activated carbons are the most commonly used sorbent. Activated carbons are microporous and are good sorbents for a variety of compounds such as volatile organic compounds (VOCs) through the mechanism of physisorption. Physisorbed compounds are adsorbed but do not chemically react with the surface of the activated carbons.

Unlike many volatile organic compounds, ammonia and volatile amines typically are not effectively captured by physisorption. Rather, ammonia and volatile amines are usually more effectively captured through chemisorption where the compounds chemically react with the sorbent itself or with a compound impregnated into the sorbent. Many efforts have been made to impregnate activated carbons with various materials that can react with ammonia and volatile amines. For example, activated carbon has been impregnated with various mineral acids such as sulfuric acid and phosphoric acid. The highly corrosive nature of these impregnated mineral acids make the manufacture of these sorbents difficult. These acidic impregnates are often replaced with metal salts such as metal chlorides or metal acetates. The capacities of activated carbons impregnated with the metal salt can be comparable to activated carbons impregnated with mineral acid.

Siliceous materials have been treated with divalent metals and have been used, for example, in desulfurization (see Song et al. article in *Advanced Materials Research*, Vols. 926-930, 4322-4225 (2014)), to recover ammonia from industrial wastewater (see Yang et al. article in *Membranes*, 4, 40-54 (2014)), and combined with zeolite materials to trap and remove undesirable gases such as ammonia, ethylene oxide, formaldehyde, and nitrous oxide (see U.S. Pat. No. 7,559,981 B2 (Friday et al.)).

SUMMARY

Metal-containing sorbent materials are provided that can sorb basic, nitrogen-containing compounds (particularly those compounds that are volatile under use conditions). More specifically, the metal-containing sorbent materials include a) a precursor that is a porous siliceous material that has been treated with a surface treatment agent and b) a divalent metal incorporated into the siliceous precursor material. When the metal-containing sorbent material sorbs basic, nitrogen-containing compounds, metal complexes are formed within the sorbent material. That is, the reaction product of the metal-containing sorbent material and the basic, nitrogen-containing compounds is a composite material that contains metal complexes. Methods of using the metal-containing sorbent materials to capture basic, nitrogen-containing compounds also are provided.

In a first aspect, a metal-containing sorbent is provided. The metal-containing sorbent includes a) a precursor and b) a divalent metal incorporated into the precursor in an amount equal to at least 1 weight percent based on the total weight of the sorbent. The precursor includes a reaction product of a mixture containing 1) a porous siliceous material and 2) a surface treatment agent. The porous siliceous material has mesopores. The surface treatment agent is added in an amount in a range of 0.1 to 4.5 mmoles per gram of the porous siliceous material. The surface treatment agent is a silane of Formula (I), a disilazane of Formula (II), or a mixture of the silane of Formula (I) and the disilazane of Formula (II).

$$R^1-Si(R^2)_{3-x}(R^3)_x \qquad (I)$$

$$(R^4)_3-Si-NH-Si(R^4)_3 \qquad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group.

In a second aspect, a composite material is provided. The composite material includes a) a precursor and b) a metal complex incorporated into the precursor that contains a reaction product of 1) a divalent metal and 2) at least one basic, nitrogen-containing compound. The precursor includes a reaction product of a mixture containing 1) a porous siliceous material and 2) a surface treatment agent. The porous siliceous material has mesopores. The surface treatment agent is added in an amount in a range of 0.1 to 4.5 mmoles of the surface treatment agent per gram of the porous siliceous material. The surface treatment agent is a silane of Formula (I), a disilazane of Formula (II), or a mixture of the silane of Formula (I) and the disilazane of Formula (II).

$$R^1-Si(R^2)_{3-x}(R^3)_x \qquad (I)$$

$$(R^4)_3-Si-NH-Si(R^4)_3 \qquad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group.

In a third aspect, a method of capturing a basic, nitrogen-containing compound is provided. The method includes providing a metal-containing sorbent as described above in the first aspect. The method further includes exposing the metal-containing sorbent to the basic, nitrogen-containing compound to form a metal complex-containing composite.

In a fourth aspect, a method of preparing a metal-containing sorbent is provided. The method includes providing a porous siliceous material having mesopores. The method further includes treating the porous siliceous material with a surface treatment agent to form a precursor, wherein treating includes adding 0.1 to 4.5 mmoles of the surface treatment agent per gram of the porous siliceous material. The surface treatment agent is a silane of Formula (I), a disilazane of Formula (II), or a mixture of the silane of Formula (I) and the disilazane of Formula (II).

$$R^1\text{—}Si(R^2)_{3-x}(R^3)_x \quad (I)$$

$$(R^4)_3\text{—}Si\text{—}NH\text{—}Si(R^4)_3 \quad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group. The method yet further includes incorporating a divalent metal into the precursor in an amount equal to at least 1 weight percent based on the total weight of the sorbent.

DETAILED DESCRIPTION

Figure 1:
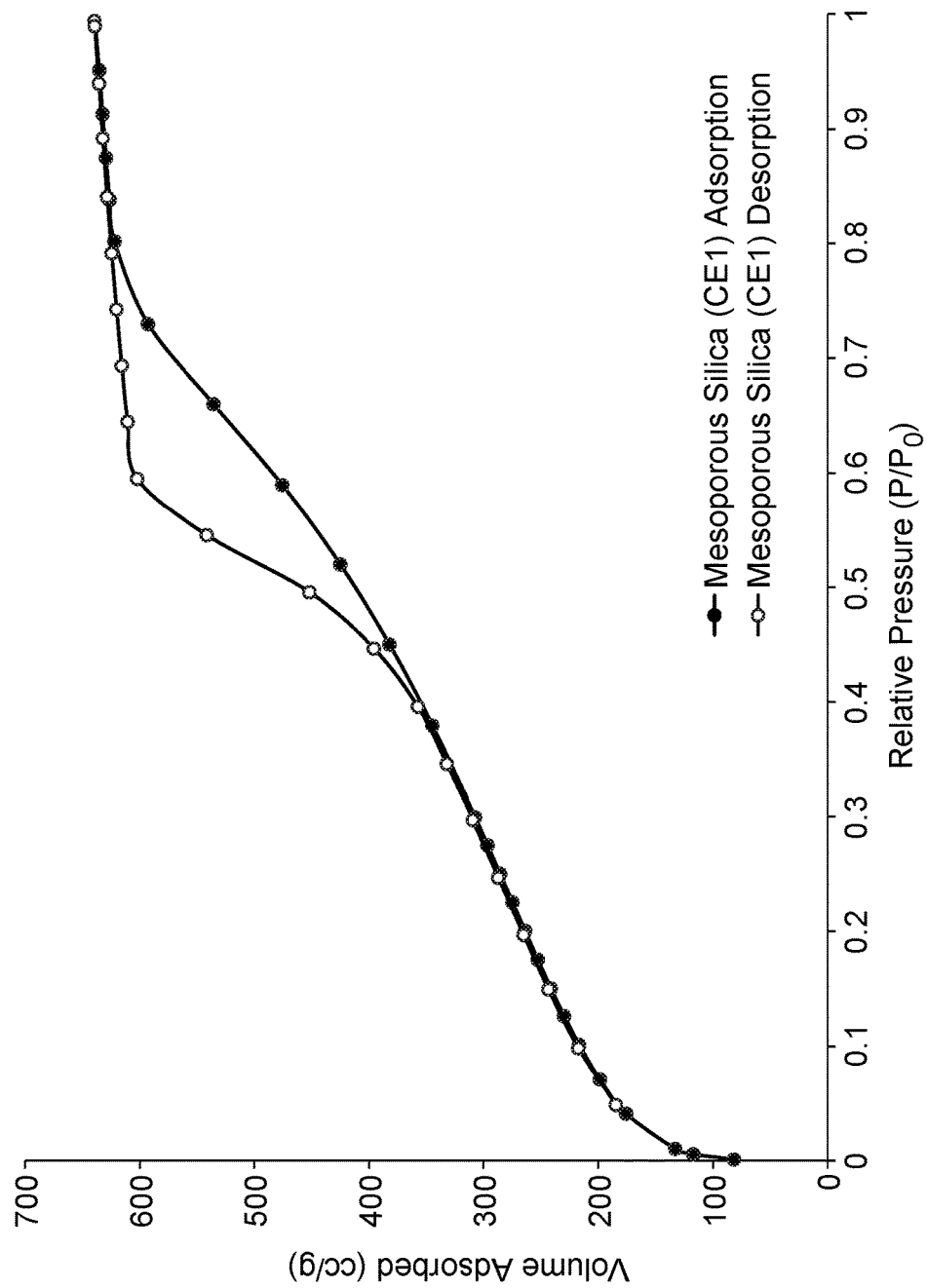
FIG. 1 is a plot of the nitrogen adsorption and desorption isotherms at 77° K and at relative pressures up to 0.98±0.01 for an exemplary porous siliceous material.

Metal-containing sorbent materials are provided, methods of making the metal-containing sorbent materials, methods of using the metal-containing sorbent materials, and metal complex-containing composite materials resulting from the sorption of basic, nitrogen-containing compounds on the metal-containing sorbent materials are provided. The sorbent materials are prepared by incorporating divalent metals into a precursor material that is formed by treating a porous siliceous material with a silane and/or disilazane surface treatment agent. The porous siliceous material has mesopores. The metal-containing sorbent materials can be used to capture basic, nitrogen-containing compounds such as those having a molecular weight no greater than 150 grams/mole. This capture results in the formation of composite materials that contain incorporated metal complexes.

The term "a", "an", and "the" are used interchangeably with "at least one" to mean one or more of the elements being described.

The term "and/or" means either or both. For example "A and/or B" means only A, only B, or both A and B.

The term "sorbing" and similar words such as "sorb", "sorbed", and "sorption" refer to the addition of a first substance (e.g., a gas such as a volatile amine compound) to a second substance (e.g., a porous material) by adsorbing, absorbing, or both. Likewise, the terms "sorbent" refers to a second substance that sorbs a first substance by adsorbing, absorbing, or both.

Porous materials such as porous siliceous materials and porous sorbent materials can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a porous material can be determined from an adsorption isotherm of an inert gas such as nitrogen or argon by the porous material under cryogenic conditions (e.g., liquid nitrogen at 77° K). The adsorption isotherm is typically obtained by measuring adsorption of the inert gas such as nitrogen or argon by the porous material at multiple relative pressures in a range of about $10^{-6}$ to about 0.98±0.01. The isotherms are then analyzed using various methods such as the BET (Brunauer-Emmett-Teller) method to calculate specific surface area and such as the Density Functional Theory (DFT) to characterize the porosity and the pore size distribution.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (i.e., 77° K) over a range of relative pressures. The term "BET specific surface area" is the surface area per gram of a material that is typically calculated from adsorption isotherm data of the inert gas over a relative pressure range of 0.05 to 0.3 using the BET method.

The term "divalent metal" refers to a metal having an oxidation state of +2. The divalent metal typically is from Group 2 or Groups 6 to 12 of the IUPAC Periodic Table of Elements. To avoid confusion, Group 2 has beryllium as its lightest member, Group 6 has chromium as its lightest member, Group 7 has manganese as its lightest member, Group 8 has iron as its lightest member, Group 9 has cobalt as its lightest member, Group 10 has nickel as its lightest member, Group 11 has copper as its lightest member, and Group 12 has zinc as its lightest member. The divalent metal can be in the form of a metal salt, a metal complex, a metal oxide, or the like.

The terms "precursor" and "precursor material" are used interchangeably.

The terms "sorbent material", "sorbent", "metal-containing sorbent material" and "metal-containing sorbent" are used interchangeably.

The terms "siliceous material" and "porous siliceous material" are used interchangeably.

The term "alkyl" refers to a monovalent group that is a radical of an alkane. The alkyl group can have 1 to 20 carbon atoms and can be linear, branched, cyclic, or a combination thereof. When the alkyl is linear, it can have 1 to 20 carbon atoms. When the alkyl is branched or cyclic, it can have 3 to 20 carbon atoms. The alkyl group can have at least 1 carbon atom, at least 2 carbon atoms, at least 3 carbon atoms, or at least 4 carbon atoms. The alkyl group can have up to 20 carbon atoms, up to 18 carbon atoms, up to 16 carbon atoms, up to 12 carbon atoms, up to 10 carbon atoms, up to 8 carbon atoms, or up to 6 carbon atoms.

The term "alkylene" refers to a divalent group that is a radical of an alkane. The alkylene group can have 1 to 20 carbon atoms and can be linear, branched, cyclic, or a combination thereof. When the alkylene is linear, it can have 1 to 20 carbon atoms. When the alkylene is branched or cyclic, it can have 3 to 20 carbon atoms. The alkylene group can have at least 1 carbon atom, at least 2 carbon atoms, at least 3 carbon atoms, or at least 4 carbon atoms. The alkylene group can have up to 20 carbon atoms, up to 18 carbon atoms, up to 16 carbon atoms, up to 12 carbon atoms, up to 10 carbon atoms, up to 8 carbon atoms, or up to 6 carbon atoms.

The term "alkoxy" refers to a monovalent group having an oxy group bonded directly to an alkyl group. Stated differently, an alkoxy is a group of formula —OR where R is an alkyl. The number of carbon atoms in the alkyl group included in the alkoxy group is the same as described above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group can have 5 to 20 carbon atoms, 6 to 20 carbon atoms, 6 to 16 carbon atoms, 6 to 12 carbon atoms, or 6 to 10 carbon atoms.

The term "arylene" refers to a divalent group that is a radical of an aromatic carbocyclic compound. The arylene group has at least one aromatic carbocyclic ring and can have 1 to 5 optional rings that are connected to or fused to the aromatic carbocyclic ring. The additional rings can be aromatic, aliphatic, or a combination thereof. The arylene group can have 5 to 20 carbon atoms, 6 to 20 carbon atoms, 6 to 16 carbon atoms, 6 to 12 carbon atoms, or 6 to 10 carbon atoms.

The term "aryloxy" refers to a monovalent group of formula —OAr where Ar is an aryl as defined above.

The term "aralkyl" refers to an alkyl substituted with an aryl group. The alkyl and aryl groups are the same as described above. An aralkyl can be represented by the formula —$R^a$—Ar where $R^a$ is an alkylene as described above and Ar is an aryl as described above.

The term "alkaryl" refers to an aryl substituted with an alkyl group. The aryl and alkyl groups are the same as described above. An alkaryl can be represented by the formula —$Ar^1$—R where $Ar^1$ is an arylene as described above and R is an alkyl as described above.

The term "aralkoxy" refers to a group of formula —O—$R^a$—Ar where $R^a$ is an alkylene as described above and Ar is an aryl as described above.

The term "alkaryloxy" refers to a group of formula —O—$Ar^1$—R where $Ar^1$ is an arylene as described above and R is an alkyl as described above.

The term "acyloxy" refers to a monovalent group of formula —O(CO)$R^b$ where $R^b$ is alkyl, aryl, alkaryl, or aralkyl. The alkyl, aryl, alkaryl, and aralkyl groups are the same as described above.

The term "halo" refers to a halogen atom such as fluoro, bromo, iodo, or chloro. When part of a reactive silyl group, the halo group is often chloro.

The term "hydrolyzable group" refers to a group that can react with water under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkoxy, alkaryloxy, acyloxy, or halo. As used herein, the term is often used in reference to one or more groups bonded to a silicon atom in a silyl group. The alkoxy, aryloxy, aralkoxy, alkaryloxy, acyloxy, and halo groups are the same as described above.

The term "non-hydrolyzable group" refers to a group that cannot react with water under conditions of atmospheric pressure. Typical non-hydrolyzable groups include, but are not limited to hydrogen, alkyl, aryl, alkaryl, and aralkyl. As used herein, the term is often used in reference to one or more groups bonded to a silicon atom in a silyl group. The alkyl, aryl, alkaryl, and aralkyl groups are the same as described above.

The term "room temperature" refers to a temperature in a range of 20° C. to 30° C. or in a range of 20° C. to 25° C.

In one aspect, a metal-containing sorbent is provided. In another aspect, a method of making the metal-containing sorbent is provided. The metal-containing sorbent includes a) a precursor and b) a divalent metal incorporated into the precursor in an amount equal to at least 1 weight percent based on the total weight of the sorbent. The precursor is formed by treating a porous siliceous material having mesopores with a surface treatment agent. The surface treatment agent includes a silane, a disilazane, or a mixture thereof.

Any porous siliceous material having mesopores can be reacted with the surface treatment agent to form the precursor. The terms "precursor" and "precursor material" are used interchangeably. The porous siliceous material has mesopores (i.e., the siliceous material is mesoporous), which are pores having a diameter in a range of 2 to 50 nanometers. The average pore diameter of all the pores within the porous siliceous material is typically in the mesoporous size range (i.e., the average pore diameter is in a range of 2 to 50 nanometers). The average pore diameter is often in a range of 2 to 40 nanometers, 2 to 30 nanometers, 2 to 20 nanometers, or 2 to 10 nanometers. The method for calculating the average pore diameter is described in the Examples section below.

Typically, at least 50 volume percent of the total pore volume of the porous siliceous material is attributable to mesopores. In some embodiments, at least 55 volume percent, at least 60 volume percent, at least 65 volume percent, at least 70 volume percent, at least 75 volume percent, at least 80 volume percent, at least 85 volume percent, or at least 90 volume percent of the total pore volume of the porous siliceous material is attributable to mesopores. The method for calculating the volume percent is described in the Examples section below.

The total pore volume of the porous siliceous material is often at least 0.5 $cm^3$/gram, at least 0.6 $cm^3$/gram, at least 0.7 $cm^3$/gram, at least 0.8 $cm^3$/gram, or at least 0.9 $cm^3$/gram. The pore volume can be, for example, up to 1.5 $cm^3$/gram or higher, up to 1.4 $cm^3$/gram, up to 1.3 $cm^3$/gram, up to 1.2 $cm^3$/gram, up 1.1 $cm^3$/gram, or up to 1.0 $cm^3$/gram.

The specific surface area of the porous siliceous material is often at least 50 $m^2$/gram, at least 100 $m^2$/gram, at least 200 $m^2$/gram, or at least 300 $m^2$/gram. The specific surface area can be up to 1000 $m^2$/gram or higher, up to 900 $m^2$/gram, up to 800 $m^2$/gram, up to 700 $m^2$/gram, up to 600 $m^2$/gram, or up to 500 $m^2$/gram.

Some example porous (e.g., mesoporous) siliceous materials can be formed using a procedure similar to that described in an article by H. Böttcher et al. in *Advanced Materials*, Vol. 11, No. 2, 138-141 (1999). More specifically, a sol gel technique can be used to form the porous siliceous materials. A tetraalkoxy silane, a trialkoxy silane, or a mixture thereof can be hydrolyzed in the presence of an organic solvent. Some of the organic solvent can get entrapped within the sol as it is formed. The organic solvent can subsequently be removed by drying the sol resulting in the formation of a gel (e.g., a xerogel) having pores where the organic solvent previously resided.

Suitable tetraalkoxy silanes and trialkoxy silanes for preparation of the gel are often of Formula (III).

$$(R^5)_y Si(R^6)_{4-y} \quad \text{(III)}$$

In Formula (III), $R^5$ is an alkyl group or hydrogen; and $R^6$ is an alkoxy or halo group. Suitable alkyl, alkoxy, and halo groups are described above. The variable y is an integer equal to 0 or 1.

In some embodiments of Formula (III), $R^5$ is an alkyl group, $R^6$ is an alkoxy group or chloro, and the variable y is equal to 1. The $R^5$ alkyl group and $R^6$ alkoxy group often have 1 to 10 carbon atoms, 1 to 6 carbon atoms, 1 to 4 carbon atoms, or 1 to 3 carbon atoms. For example, the compounds of Formula (III) can be a trialkoxy(alkyl)silane such as trimethoxy(methyl)silane, triethoxy(methyl)silane, triethoxy(ethyl)silane, triethoxy(n-propyl)silane, triethoxy(iso-butyl)silane, tripropoxy(methyl)silane, isooctyl triethoxysilane, trimethoxysilane, triethoxysilane, or trichloromethylsilane.

In other embodiments, $R^6$ is an alkoxy or chloro, and y is equal to 0 (i.e., there are no $R^5$ groups). The $R^6$ alkoxy group often has 1 to 10 carbon atoms, 1 to 6 carbon atoms, 1 to 4 carbon atoms, or 1 to 3 carbon atoms. For example, the compound of Formula (III) can be a tetraalkoxysilane such as tetramethoxysilane, tetraethoxysilane, tetrapropoxysilane, or silicon tetrachloride.

The compound of Formula (III) is initially mixed with an organic solvent. The organic solvent is typically selected to be miscible with (i.e., to dissolve) the compound of Formula (III) and to be easily removed from the sol by drying. Example organic solvents include, but are not limited to, alcohols of lower alkanols (e.g., ethanol, methanol, propanol, isopropanol, butanol, sec-butyl alcohol, tert-butyl alcohol, amyl alcohol, hexyl alcohol, methoxy propanol and 2-ethyl alcohol), ketones (e.g., acetone, methyl ethyl ketone, methyl isobutyl ketone, methyl amyl ketone, and methyl n-butyl ketone), esters (e.g. butyl acetate, 2-ethoxyethyl acetate and 2-ethylhexyl acetate), and ethers (e.g., tetrahydrofuran, ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether, and dipropylene glycol monobutyl ether).

The mixture of the compound of Formula (III) and the organic solvent usually has a pH adjusted to be in a range of 2 to 4. Although any suitable acid can be used, the acid is often a mineral acid such as, for example, hydrochloric acid, nitric acid, phosphoric acid, or sulfuric acid. The acid is typically diluted with water prior to adjusting the pH of the mixture.

The amount of organic solvent included in the mixture (e.g., the mixture of the compound Formula (III), the dilute acid, and organic solvent) can influence the pore volume of the porous siliceous material that is formed. That is, a larger volume of the organic solvent in the mixture tends to lead to higher pore volumes in the porous siliceous material. The mixture often includes at least 20 volume percent organic solvent. In some embodiments, the amount of the organic solvent is at least 30 volume percent, at least 40 volume percent, or at least 50 volume percent of the mixture. The upper limit is often 90 volume percent. If the volume percent is higher, the amount of porous siliceous material formed may be undesirably low. The volume percent of the organic solvent in the mixture can be up to 85 volume percent, up to 80 volume percent, up to 75 volume percent, up to 70 volume percent, up to 65 volume percent, up to 60 volume percent, or up to 55 volume percent.

After aging the mixture for several hours, the pH is increased to 7 or greater. Any suitable base (e.g., dilute ammonium hydroxide or an amine that is soluble in the mixture) can be used. The addition of the base results in the hydrolysis of the compound of Formula (III) and the formation of a gel. That is, a three-dimensional network is formed that is connected together through —O—Si—O— linkages. The gel often forms within minutes of adding the base. The resulting gel can be collected (e.g., by filtration).

The gel is then dried to remove the organic solvent from the gel. Typically, the drying temperature is selected for effective removal of the organic solvent. Removal of the organic solvent leads to pores within the siliceous material. The drying temperature is often selected to be higher than the boiling point of the organic solvent. In some embodiments, the drying temperature is selected to be at least 10° C. higher, at least 20° C. higher, or at least 30° C. higher than the boiling point of the organic solvent. Often, the drying temperature is set at a first temperature to remove most of the organic solvent and then at a second higher temperature to remove any residual water. The drying temperature of either step can be, for example, up to 150° C., up to 140° C., up to 130° C., up to 120° C., up to 110° C., or up to 100° C.

Other example porous siliceous materials can be formed by mixing an aqueous metal silicate (e.g., aqueous sodium silicate) with an acid (e.g., sulfuric acid), precipitating the sodium salt, bringing the mixture to an alkaline pH, and aging for a time sufficient to form a gel in the presence of a porogen (e.g. an organic solvent). This preparation method is further described, for example, in U.S. Pat. No. 7,559,981 B2 (Friday et al.).

A further example of a porous siliceous material could be prepared from a colloidal silica sol such as those having an average particle size in the range of 2 to 50 nanometers. The sols can be either acid or base stabilized. Such silica sols are commercially available from Nalco Company (Naperville, Ill., USA) and include, for example, NALCO 2326 and NALCO 2327. The pH of the sol can be adjusted to be within the range of 5 to 8 by the addition of an acid or base. This pH adjustment results in the destabilization and subsequent aggregation of the silica particles. The aggregated silica particles can be collected and dried.

Various types of mesoporous siliceous materials are commercially available. Some of the siliceous materials have a regular arrangement of mesopores. Examples include MCM-41 (i.e., Mobile Composition of Matter No. 41) and MCM-48 (i.e., Mobile Composition of Matter No. 48), which refer to siliceous materials that were developed by researchers at Mobil Oil Corporation. Another example is SBA-15 (i.e., Santa Barbara Amorphous No. 15), which refers to a siliceous material that was developed by researchers at the University of California, Santa Barbara. Yet another example is M41S, which refers to a siliceous material that was developed by researchers at ExxonMobil. At least MCM-41 and SBA-15 are available from Sigma-Aldrich (Saint Louis, Mo., USA).

Other porous siliceous materials (e.g., silica gels) are commercially available, for example, under the trade designation DAVISIL from W. R. Grace and Company (Columbia, Md., USA). Porous siliceous materials are available, for example, having an average pore diameter of 6 nanometers (DAVISIL LC60A), 15 nanometers (DAVISIL LC150A), 25 nanometers (DAVISIL LC250A), and 50 nanometers (DAVISIL LC500A). Still other porous siliceous materials include silica gels commercially available from Material Harvest Limited (Cambridge, England), from SiliCycle Inc.

(Quebec City, Canada), and from EMD Millipore (Darmstadt, Germany) under the trade designation LICHROPREP.

In some embodiments, an acid-base indicator can be added to the porous siliceous material prior to reaction with the surface treatment agent to form the precursor material. That is, both the later formed precursor material and sorbent can include the acid-base indicator. The acid-base colorimetric indicator is a compound (typically an organic dye) that changes color when it undergoes a transition from being in an acidic form to being in a basic form. The acid-base colorimetric indicator is typically selected to have a $pK_b$ that is less than a $pK_b$ of the nitrogen-containing compound that will be sorbed on the sorbent material. That is, the acid-base colorimetric indicator is selected to change from a first color to a second color when all or a significant portion of the capacity of the sorbent for sorption of a nitrogen-containing compound has been reached or is close to being reached. As used herein, the term "close to being reached" means that at least 60 percent or more of the capacity has been reached (i.e., a least 60 percent or more of the available sorption sites have been used for sorption of the nitrogen-containing compound). For example, at least 70 percent, at least 80 percent, at least 90 percent, or at least 95 percent of the sorption sites have been used for sorption of the nitrogen-containing compound.

Knowing the $pK_b$ of the nitrogen-containing compound that is to be sorbed, one of skill in the art can readily select an acid-base colorimetric indicator that has a lower $pK_b$ value. In some applications, the difference between the $pK_b$ value of the nitrogen-containing compound and the $pK_b$ of the acid-base colorimetric indicator is at least 1, at least 2, at least 3, or at least 4. The $pK_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the porous siliceous material using any suitable method. In some embodiments, the porous siliceous material is soaked in a solution of the acid-base colorimetric indicator for at least 10 minutes, at least 20 minutes, at least 30 minutes, at least 1 hour, at least 2 hours, at least 4 hours, or at least 8 hours. Often, the soaking solution contains about 1 milligram of acid-base indicator per gram of the porous siliceous material.

The porous siliceous material is reacted with a surface treatment agent. The surface treatment agent is a silane of Formula (I), a disilazane of Formula (II), or a mixture of the silane of Formula (I) and the disilizane of Formula (II).

(I)

(II)

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group. The surface treatment agent is typically one or more compounds of Formula (I), one or more compounds or Formula (II), or a mixture of one or more compounds of Formula (I) plus one or more compounds of Formula (II). At least in some embodiments, if more than one surface treatment agent is used, the multiple surface treatment agents often are of Formula (I).

Group $R^1$ in Formula (I) is a hydrocarbon or fluorinated hydrocarbon group. This group often provides or enhances the hydrophobic character of the surface of the precursor that is formed by reacting the compound of Formula (I) with the porous siliceous material. As used herein, the term "hydrocarbon" refers to a group that includes only carbon and hydrogen atoms. As used herein, the term "fluorinated hydrocarbon" refers to a group in which at least one hydrogen atom of a hydrocarbon group has been replaced with a fluorine atom. A hydrocarbon group or a fluorinated hydrocarbon group can be saturated, partially unsaturated, or unsaturated (e.g., aromatic). Suitable hydrocarbon groups are monovalent and include, for example, alkyl groups, aryl groups, aralkyl groups, and alkaryl groups. Suitable fluorinated hydrocarbon groups are monovalent and include, for example, fluorinated alkyl groups (i.e., alkyl groups substituted with one or more fluoro groups), fluorinated aryl groups (i.e., aryl groups substituted with one or more fluoro groups), fluorinated aralkyl groups (i.e., aralkyl groups substituted with one or more fluoro groups), and fluorinated alkaryl groups (i.e., alkaryl groups substituted with one or more fluoro groups). In many embodiments, $R^1$ is an alkyl, fluorinated alkyl, aryl, fluorinated aryl, aralkyl, fluorinated aralkyl, alkaryl, or fluorinated alkaryl. In most embodiments, the hydrocarbon or fluorinated hydrocarbon group does not react with the surface of the porous siliceous material, with the divalent metal, or with the nitrogen-containing compound.

Group $R^2$ in Formula (I) is a hydrolyzable group. The hydrolyzable group is the reaction site of the surface treatment agent with the porous siliceous material (e.g., with hydroxyl groups on the surface of the porous siliceous material). When the hydrolyzable group reacts with the surface of the porous siliceous material, —O—Si—O— bonds are formed attaching the surface treatment agent to the porous siliceous material. The hydrolyzable groups can be an alkoxy, aryloxy, alkaryloxy, aralkoxy, acyloxy, or halo. These groups are the same as described above. In many embodiments, $R^2$ is alkoxy or halo.

Group $R^3$ in Formula (I) is a non-hydrolyzable group. Typical non-hydrolyzable groups include, but are not limited to, hydrogen, alkyl, aryl, alkaryl, and aralkyl. These groups are the same as described above. In many embodiments, $R^3$ is hydrogen, an alkyl, or is absent (x is equal to 0).

In some embodiments of Formula (I), $R^1$ is an alkyl, fluorinated alkyl, aryl, fluorinated aryl, aralkyl, fluorinated aralkyl, alkaryl, or fluorinated alkaryl; each $R^2$ is alkoxy or halo; and x is equal to 0 ($R^3$ is absent). Often, alkoxy $R^2$ groups have 1 to 10 carbon atoms, 1 to 6 carbon atoms, 1 to 4 carbon atoms, or 1 to 3 carbon atoms and halo $R^2$ groups are chloro. Examples include, but are not limited to, trimethoxy(methyl)silane, trimethoxy(3,3,3-trifluoropropyl)silane, trimethoxy(propyl)silane, trimethoxy (isobutyl)silane, triethoxy(methyl)silane, triethoxy(ethyl)silane, trimethoxy(phenyl)silane, tripropoxy(methyl)silane, trimethoxy(2-phenylethyl)silane, triethoxy(cyclopentyl)silane, trimethoxy(isooctyl)silane, triethoxy(pentafluorophenyl)silane, triethoxy(phenyl)silane, triethoxy(p-tolylsilane), triethoxy(1H,1H,2H,2H-perfluorooctyl)silane, triethoxy(dodecyl)silane, trimethoxy(hexadecyl)silane, and triethoxy(n-octadecyl)silane, methylchlorosilane, ethyltrichlorosilane, butyltrichlorosilane, trichloro(octyl)silane, and trichlorophenylsilane.

In other embodiments of Formula (I), $R^1$ is an alkyl, fluorinated alkyl, aryl, fluorinated aryl, aralkyl, fluorinated aralkyl, alkaryl, or fluorinated alkaryl; each $R^2$ is alkoxy or halo; each $R^3$ is independently hydrogen or alkyl; and x is equal to 1 or 2. Often, alkoxy $R^2$ groups have 1 to 10 carbon atoms, 1 to 6 carbon atoms, 1 to 4 carbon atoms, or 1 to 3 carbon atoms and halo $R^2$ groups are chloro. Further, alkyl $R^3$ groups often have 1 to 10 carbon atoms, 1 to 6 carbon atoms, 1 to 4 carbon atoms, or 1 to 3 carbon atoms.

Examples of Formula (I) where $R^1$ is an alkyl or aryl, $R^2$ is halo or alkoxy, and each $R^3$ is independently hydrogen or methyl include, but are not limited to, dichloromethylsilane, chlorodimethylsilane, methyldie thoxysilane, die thoxy(methyl)phenylsilane, dimethoxy(methyl)octylsilane, and chlorophenylsilane.

A surface treatment agent of Formula (II) can be used in place of or combination with the surface treatment agent of Formula (I). In Formula (II), each $R^4$ group is a hydrocarbon group. Suitable hydrocarbon groups are monovalent and include, for example, alkyl groups, aryl groups, aralkyl groups, and alkaryl groups. These groups are the same as described above.

In many embodiments of the surface treatment agent of Formula (II), each $R^4$ group is an alkyl. In some specific embodiments, each $R^4$ group has 1 to 10 carbon atoms, 1 to 6 carbon atoms, 1 to 4 carbon atoms, or 1 to 3 carbon atoms. For example, the compound of Formula (II) is hexamethylsilazane, with $R^4$ being methyl.

In many embodiments, the only surface treatment agents used are those of Formula (I) and/or Formula (II). There are no surface treatment agents that lack a hydrophobic group such as $R^1$ in Formula (I) and $R^4$ in Formula (II). That is, there is no surface treatment agent used that would replace $R^1$ or $R^4$ with a hydrophilic group or a reactive functional group such as an alkyl that is substituted with a primary amino group.

The surface treatment agent can be added to the porous siliceous material using any known method. In some methods, the porous siliceous material is dispersed in an aqueous solution. The surface treatment agent is dissolved in an organic solvent that is miscible with water and then added slowly to the dispersion. The reaction of the surface treatment agent with the porous siliceous material can be done under acidic conditions (such as in a pH range of 1 to 5) or under basic conditions (such as in a pH range of 9 to 12). Hydrolysis of the surface treatment agent allows reaction with hydroxyl groups on the surface of the porous siliceous material. This reaction results in the formation of —O—Si—O— linkages between the surface of the porous siliceous material and the surface treatment agent. That is, the surface treatment agent is covalently bound to the surface of the porous siliceous material. The resulting material, which is referred to as the precursor material, tends to have a more hydrophobic surface than the porous siliceous material prior to reaction with the surface treatment agent. Stated differently, the surface treatment agent is typically added to impart hydrophobic character or to enhance the hydrophobic character of the precursor.

The surface treatment agent is typically added in an amount that is in a range of 0.1 to 4.5 mmoles per gram of the porous siliceous material. If the amount of the surface treatment agent is less than 0.1 mmole per gram of the porous siliceous material, the precursor may not be sufficiently hydrophobic. The hydrophobicity tends to increase the ability of the sorbent material to sorb basic, nitrogen-containing compounds. In some embodiments, the amount of the surface treatment agent is added in an amount equal at least 0.2 mmoles per gram, at least 0.3 mmoles per gram, at least 0.5 mmoles per gram, or at least 1 mmole per gram of the porous siliceous material. The amount of the surface treatment agent (e.g., the surface treatment agent minus the groups that are given off in the condensation reaction) is typically selected to provide no greater than a monolayer to the surface of the porous siliceous material. The ability of the sorbent material to sorb basic, nitrogen-containing compounds tends to decrease when more than a monolayer of the surface treatment agent is added. In some embodiments, the amount of added surface treatment agent can be up to 4.5 mmoles per gram, up to 4.0 mmoles per gram, up to 3.5 mmoles per gram, up to 3.0 mmoles per gram, up to 2.5 mmoles per gram, or up to 2 mmoles per gram of the porous siliceous material.

The reaction to form the precursor material can occur at room temperature or at an elevated temperature (i.e., at a temperature greater than room temperature). In some embodiments, the reaction temperature is at least 30° C., at least 40° C., at least 50° C., at least 60° C., or at least 70° C. The temperature is usually selected so that the water and organic solvent included in the mixture are not removed by boiling during the reaction period. The reaction period can be for any time sufficient to form the precursor material. In some embodiments, the reaction temperature is held at 75° C. for up to 24 hours, up to 20 hours, up to 16 hours, up to 8 hours, up to 4 hours, up to 2 hours, or up to 1 hour.

After formation of the precursor, a divalent metal is incorporated into the precursor to form the metal-containing sorbent material. The divalent metal is typically incorporated by treating the precursor with a metal salt. Any known procedure for adding the divalent metal to the precursor can be used. In many embodiments, a metal salt or a solution of a metal salt (e.g., a metal salt dissolved in water) is added to the precursor prior to removal of the organic solvent and/or water present during the surface modification process (i.e., the process to react the surface treatment agent with the porous siliceous material). This mixture is often stirred for several hours to allow sufficient time for impregnation of the divalent metal into the precursor. The mixing time of the metal salt with the precursor material is often up to 1 hour, up to 2 hours, up to 4 hours, up to 8 hours, up to 16 hours, up to 24 hours, or up to 48 hours. The mixing temperature can be at room temperature or above. The resulting sorbent material can then be separated from the organic solvent and/or water by filtration. The sorbent can be dried at a temperature sufficient to remove any remaining water and/or organic solvent. For example, the sorbent can be dried at temperatures in a range of 80° C. to 150° C.

The metal salt incorporated into the precursor material contains a cation that is the divalent metal (i.e., a metal with a +2 oxidation state) and one or more anions to balance the charge. Suitable metal ions (divalent metals) are typically from Group 2 or Groups 6 to 12 of the periodic table. Example divalent metals include, but are not limited to, chromium, nickel, cobalt, copper, zinc, manganese, cadmium, iron, magnesium, calcium, barium, or a mixture thereof. In many embodiments, the divalent metal is a Group 6 to 12 metal such as, for example, chromium, nickel, cobalt, copper, zinc, iron, or a mixture thereof. In some particular embodiments, the divalent metal is copper, cobalt, zinc, or nickel. In some even more particular embodiments, the divalent metal is zinc or copper.

The metal salts are typically selected from those that are soluble in water and/or an organic solvent that is miscible with water. The anion of the metal salt is often a halide (e.g., chloride), nitrate, sulfate, carboxylate (e.g., acetate, formate, and propanoate), or halogen-substituted carboxylates (e.g., chloroacetate, dichloroacetate, and chloro-substituted propanoate). In many embodiments, the anion is chloride, acetate, or nitrate.

Examples of specific metal salts include, but are not limited to, zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc propanoate, copper propanoate, nickel propanoate, cobalt propanoate, iron propanoate, manganese propanoate, cadmium propanoate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, chromium chloride, magnesium chloride, zinc sulfate, copper sulfate, nickel sulfate, cobalt sulfate, iron sulfate, manganese sulfate, cadmium sulfate, zinc nitrate, copper nitrate, nickel nitrate, cobalt nitrate, iron nitrate, and the like.

The amount of the divalent metal added to the precursor is typically at least 1 weight percent based on the weight of the sorbent material. If the amount is lower than 1 weight percent, the resulting sorbent material may have an undesirably low capacity for sorbing nitrogen-containing compounds. The amount of the divalent metal can be at least 2 weight percent, at least 3 weight percent, at least 4 weight percent, or at least 5 weight percent based on the weight of the sorbent material. The divalent metal can be included in an amount up to 50 weight percent. If the amount is greater than about 50 weight percent, the resulting sorbent material may have an undesirably low capacity for sorbing nitrogen-containing compounds. For example, the amount can be up to 45 weight percent, up to 40 weight percent, up to 35 weight percent, up to 30 weight percent, up to 25 weight percent, or up to 20 weight percent based on the weight of the sorbent material. For example, the amount is often in a range of 1 to 50 weight percent, 1 to 40 weight percent, 1 to 30 weight percent, 1 to 20 weight percent, 5 to 50 weight percent, 5 to 40 weight percent, 5 to 30 weight percent, 5 to 25 weight percent, 5 to 20 weight percent, 10 to 50 weight percent, 10 to 40 weight percent, 10 to 30 weight percent, 10 to 25 weight percent, 10 to 20 weight percent, 15 to 50 weight percent, 15 to 40 weight percent, 15 to 30 weight percent, or 15 to 25 weight percent based on the weight of the sorbent material.

In some embodiments such as with zinc-containing, cobalt-containing, nickel-containing, and magnesium-containing sorbent materials, the divalent metal may be present as an ionic species. For a divalent metal that is ionic, a crystalline phase that includes the metal species usually cannot be detected when the metal-containing sorbent materials are analyzed using x-ray diffraction. In other embodiments such as with copper-containing sorbent materials, the divalent metal may be present as an oxide. For metal oxides, a crystalline phase may be detected when the metal-containing sorbent materials are analyzed using x-ray diffraction.

In addition to providing a sorbent (i.e., a metal-containing sorbent), a method of preparing the metal-containing sorbent is provided as described above. More specifically, the method includes providing a porous siliceous material having mesopores. The method further includes treating the porous siliceous material with a surface treatment agent to form a precursor, wherein treating includes adding 0.1 to 4.5 mmoles of the surface treatment agent per gram of the porous siliceous material. The surface treatment agent is a silane of Formula (I), a disilazane of Formula (II), or a mixture of the silane of Formula (I) and the disilizane of Formula (II).

$$R^1—Si(R^2)_{3-x}(R^3)_x \qquad (I)$$

$$(R^4)_3—Si—NH—Si(R^4)_3 \qquad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group. The method yet further includes incorporating a divalent metal into the precursor in an amount equal to at least 1 weight percent based on the total weight of the sorbent to form the metal-containing sorbent.

The metal-containing sorbent material can be used to capture vapors of basic, nitrogen-containing compounds. Thus, in another aspect, a method of capturing a basic, nitrogen-containing compound of formula Q is provided. The method includes providing the metal-containing sorbent as described above and then exposing the metal-containing sorbent to vapors of the basic, nitrogen-containing compound. A metal complex is formed. The metal complex includes the reaction product of the divalent metal as defined above and at least one nitrogen-containing compound of formula Q.

The basic nitrogen-containing compounds of formula Q that react with the divalent metal to form a metal complex can be classified as Lewis bases, Bronsted-Lowry bases, or both. Suitable basic nitrogen-containing compounds often have a low molecular weight (e.g., no greater than 150 grams/mole). That is, the basic, nitrogen-containing compounds can be volatile at or near room temperature or can be volatile under conditions of use. Examples of basic, nitrogen-containing compounds include, but are not limited to, ammonia, hydrazine compounds, amine compounds (e.g., alkyl amines, dialkylamines, triaalkylamines, alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

After exposure to vapors of the basic, nitrogen-containing compound, the metal-containing sorbent material is converted into a metal complex-containing composite material. That is, in another aspect, a method of forming a metal complex-containing composite material is provided. The metal complex containing composite material is a reaction product of the metal-containing sorbent material and a basic, nitrogen-containing compound of formula Q. Alternatively, the metal complex-containing composite material can be considered to contain a) a precursor material and b) a metal complex incorporated into the precursor material. The metal complex includes a reaction product of a divalent metal and at least one basic, nitrogen-containing compound of formula Q.

In many embodiments of the metal complex-containing composite material, divalent metal incorporated into the precursor material remains that has not been converted to a metal complex. Stated differently, only some of the divalent metal in the sorbent material has reacted with a basic, nitrogen-containing compound to form a metal complex. The metal complex-containing composite material includes a mixture of divalent metal that is not complexed with the basic, nitrogen-containing compound and divalent metal that is complexed with at least one basic, nitrogen-containing compound. The total amount of divalent metal (whether it is complexed or not with the basic, nitrogen-containing compound) in the composite material is at least 1 weight percent based on a total weight of the composite material.

The total amount of the divalent metal in the composite material can be at least 2 weight percent, at least 3 weight percent, at least 4 weight percent, or at least 5 weight percent based on the total weight of the composite material. The total divalent metal can be included in an amount up to 50 weight percent. For example, the amount can be up to 45 weight percent, up to 40 weight percent, up to 35 weight percent, up to 30 weight percent, up to 25 weight percent, or up to 20 weight percent based on the total weight of the composite material. For example, the amount is often in a range of 1 to 50 weight percent, 1 to 40 weight percent, 1 to 30 weight percent, 1 to 20 weight percent, 5 to 50 weight percent, 5 to 40 weight percent, 5 to 30 weight percent, 5 to 25 weight percent, 5 to 20 weight percent, 10 to 50 weight percent, 10 to 40 weight percent, 10 to 30 weight percent, 10 to 25 weight percent, 10 to 20 weight percent, 15 to 50 weight percent, 15 to 40 weight percent, 15 to 30 weight percent, or 15 to 25 weight percent based on the total weight of the composite material.

Any portion of the total divalent metal in the composite material can be in the form of the metal complex. For example, at least 1 weight percent, at least 5 weight percent, at least 10 weight percent, or at least 20 weight percent and up to 100 weight percent, up to 90 weight percent, up to 80 weight percent, up to 70 weight percent, up to 60 weight percent, or up to 50 weight percent of the total divalent metal may be present as a metal complex in the composite.

The maximum amount of basic, nitrogen-containing compounds sorbed (e.g., complexed) by the metal-containing sorbent material is related to the amount of divalent metal incorporated into the sorbent material. The maximum amount of basic, nitrogen-containing compound sorbed is often at least 1.5 mmoles per gram of metal-containing sorbent material (i.e., 1.5 mmoles of the sorbed basic, nitrogen-containing compound per gram of metal-containing sorbent material) and can be up to 10 mmoles per gram or even higher. In many embodiments, the maximum amount sorbed is at least 2 mmoles per gram, 2.5 mmoles per gram, or at least 3 mmoles per gram. The amount sorbed can be, for example, up to 9 mmoles per gram, up to 8 mmoles per gram, up to 7 mmoles per gram, up to 6 mmoles per gram, or up to 5 mmoles per gram.

The porosity of the sorbent material (which is controlled predominately by the porosity of the porous siliceous material used to form the precursor) also affects the capacity of the metal-containing sorbent material for sorption of basic, nitrogen-containing compounds. Typically, sorbent materials with higher porosity have greater accessibility to functional group sites. Higher porosity sorbent materials, probably due to the presence of mesopores and/or micropores in the sorbent material, typically lead to higher incorporation of divalent metal. Higher incorporation of divalent metal (at least up the point where clustering and/or layering occurs) results in more coordination sites available for sorption of the basic, nitrogen-containing compounds. The porosity and BET specific surface area of the sorbent material can be altered by selection of the porous siliceous material or the method used to prepare the porous siliceous material.

In some embodiments, a color change occurs upon exposure to a basic, nitrogen-containing compound. This color change can occur, for example, when the divalent metal is either copper or nickel and/or when an acid-base indicator dye is included in the sorbent. A sorbent containing copper can change from a darkish gray color to a turquoise color and nickel can change from a tan color to an olive green color. A sorbent containing an acid-base indicator dye can also change color when the sorption capacity of the sorbent is reached or is close to being reached.

Various embodiments are provided that are a metal-containing sorbent material, a method of preparing a metal complex-containing sorbent material, a method of capturing a basic, nitrogen-containing compound on the sorbent material, and a metal complex-containing composite material.

Embodiment 1A is a metal-containing sorbent. The metal-containing sorbent includes a) a precursor and b) a divalent metal incorporated into the precursor in an amount equal to at least 1 weight percent based on the total weight of the sorbent. The precursor includes a reaction product of a mixture containing 1) a porous siliceous material and 2) a surface treatment agent. The porous siliceous material has mesopores. The surface treatment agent is added in an amount in a range of 0.1 to 4.5 mmoles per gram of the porous siliceous material. The surface treatment agent is a silane of Formula (I), a disilazane of Formula (II), or a mixture of the silane of Formula (I) and the disilizane of Formula (II).

$$R^1-Si(R^2)_{3-x}(R^3)_x \quad (I)$$

$$(R^4)_3-Si-NH-Si(R^4)_3 \quad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group.

Embodiment 2A is the metal-containing sorbent of embodiment 1A, wherein the amount of the divalent metal incorporated into the precursor is in a range of 1 to 50 weight percent based on the total weight of the sorbent.

Embodiment 3A is the metal-containing sorbent of embodiment 1A or 2A, wherein the amount of the divalent metal incorporated into the precursor is in a range of 5 to 50 weight percent based on the total weight of the sorbent.

Embodiment 4A is the metal-containing sorbent of any one of embodiments 1A to 3A, wherein the divalent metal is from a Group 2 metal or a Group 6 to 12 metal of the IUPAC Periodic Table of Elements.

Embodiment 5A is the metal-containing sorbent of any one of embodiments 1A to 4A, wherein the divalent metal is divalent zinc or copper.

Embodiment 6A is the metal-containing sorbent of any one of embodiment 1A to 5A, wherein the sorbent further comprises an acid-base indicator incorporated into the precursor.

Embodiment 7A is the metal-containing sorbent of any one of embodiments 1A to 6A, wherein the porous siliceous material has a pore volume equal to at least 0.5 cm³ per gram.

Embodiment 8A is the metal-containing sorbent of embodiment 1A to 7A, wherein the pore volume of the porous siliceous material is in a range of 0.5 to 1.0 cm³ per gram.

Embodiment 9A is the metal-containing sorbent of any one of embodiments 1A to 8A, wherein the BET specific surface area of the porous siliceous material is at least 50 m²/gram.

Embodiment 10A is the metal-containing sorbent of any one of embodiments 1A to 9A, wherein the BET specific surface area of the porous siliceous material is in a range of 50 to 1000 m²/gram.

Embodiment 11A is the metal-containing sorbent of any one of embodiments 1A to 10A, wherein the porous siliceous material is formed by hydrolysis of a tetraalkoxy silane, a trialkoxy silane, or a mixture thereof in the presence of an organic solvent.

Embodiment 12A is the metal-containing sorbent of embodiment 11A, wherein the tetraalkoxy silane, the trialkoxy silane, or the mixture thereof is of Formula (III).

$(R^5)_y Si(R^6)_{4-y}$  (III)

In Formula (III), $R^5$ is an alkyl group or hydrogen; and $R^6$ is an alkoxy or halo group. The variable y is an integer equal to 0 or 1.

Embodiment 13A is the metal-containing sorbent of any one of embodiments 1A to 12A, wherein the surface treatment agent is of Formula (I).

$R^1—Si(R^2)_{3-x}(R^3)_x$  (I)

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2.

Embodiment 14A is the metal-containing sorbent of embodiment 13A, wherein $R^1$ is an alkyl, fluorinated alkyl, aryl, fluorinated aryl, aralkyl, and fluorinated aralkyl, alkaryl, or fluorinated alkaryl.

Embodiment 15A is the metal-containing sorbent of embodiment 13A or 14A, wherein $R^2$ is an alkoxy, aryloxy, alkaryloxy, aralkoxy, acyloxy, or halo.

Embodiment 16A is the metal-containing sorbent of embodiment 15A, wherein $R^2$ is an alkoxy or halo.

Embodiment 17A is the metal-containing sorbent of embodiment 16A, wherein $R^2$ is methoxy, ethoxy, propoxy, or chloro.

Embodiment 18A is the metal-containing sorbent of any one of embodiments 13A to 16A, wherein $R^3$ is hydrogen, alkyl, aryl, alkaryl, or aralkyl.

Embodiment 19A is the metal-containing sorbent of embodiment 18A, wherein $R^3$ is hydrogen or alkyl.

Embodiment 20A is the metal-containing sorbent of any one of embodiments 1A to 12A, wherein the surface treatment agent is of Formula (II).

$(R^4)_3—Si—NH—Si(R^4)_3$  (II)

In Formula (II), $R^4$ is a hydrocarbon.

Embodiment 21A is the metal-containing sorbent of embodiment 20A, wherein $R^4$ is an alkyl.

Embodiment 22A is the metal-containing sorbent of embodiment 21A, wherein $R^4$ is methyl.

Embodiment 23A is the metal-containing sorbent of any one of embodiments 1A to 22A, wherein the porous siliceous material has pores and wherein at least 50 volume percent of the pores are mesopores.

Embodiment 24A is the metal-containing sorbent of embodiment 23A, wherein at least 60 volume percent, at least 70 volume percent, at least 80 volume percent, or at least 90 volume percent of the pores in the porous siliceous material are mesopores.

Embodiment 1B is a method of preparing a metal-containing sorbent. The method includes providing a porous siliceous material having mesopores. The method further includes treating the porous siliceous material with a surface treatment agent to form a precursor, wherein treating includes adding 0.1 to 4.5 mmoles of the surface treatment agent per gram of the porous siliceous material. The surface treatment agent is a silane of Formula (I), a disilazane of Formula (II), or a mixture of the silane of Formula (I) and the disilazane of Formula (II).

$R^1—Si(R^2)_{3-x}(R^3)_x$  (I)

$(R^4)_3—Si—NH—Si(R^4)_3$  (II)

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group. The method yet further includes incorporating a divalent metal into the precursor in an amount equal to at least 1 weight percent based on the total weight of the sorbent.

Embodiment 2B is the method of embodiment 1B, wherein incorporation comprises adding 1 to 50 weight percent divalent metal based on the total weight of the sorbent.

Embodiment 3B is the method of embodiment 1B or 2B, wherein incorporation comprises adding 5 to 50 weight percent divalent metal based on the total weight of the sorbent.

Embodiment 4B is the method of any one of embodiments 1B to 3B, wherein the divalent metal is from a Group 2 metal or a Group 6 to 12 metal of the IUPAC Periodic Table of Elements.

Embodiment 5B is the method of any one of embodiments 1B to 4B, wherein the divalent metal is divalent zinc or copper.

Embodiment 6B is the method of any one of embodiment 1B to 5B, wherein the method further comprises incorporating an acid-base indicator into the precursor.

Embodiment 7B is the method of any one of embodiments 1B to 6B, wherein the porous siliceous material has a pore volume equal to at least 0.5 cm³ per gram.

Embodiment 8B is the method of embodiment 1B to 7B, wherein the pore volume of the porous siliceous material is in a range of 0.5 to 1.0 cm³ per gram.

Embodiment 9B is the method of any one of embodiments 1B to 8B, wherein the BET specific surface area of the porous siliceous material is at least 50 m²/gram.

Embodiment 10B is the method of any one of embodiments 1B to 9B, wherein the BET specific surface area of the porous siliceous material is in a range of 50 to 1000 m²/gram.

Embodiment 11B is the method of any one of embodiments 1B to 10B, wherein the porous siliceous material is formed by hydrolysis of a tetraalkoxy silane, a trialkoxy silane, or a mixture thereof in the presence of an organic solvent.

Embodiment 12B is the method of embodiment 11B, wherein the tetraalkoxy silane, the trialkoxy silane, or the mixture thereof is of Formula (III).

$(R^5)_y Si(R^6)_{4-y}$  (III)

In Formula (III), $R^5$ is an alkyl group or hydrogen; and $R^6$ is an alkoxy or halo group. The variable y is an integer equal to 0 or 1.

Embodiment 13B is the method of any one of embodiments 1B to 12B, wherein the surface treatment agent is of Formula (I).

$R^1—Si(R^2)_{3-x}(R^3)_x$  (I)

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2.

Embodiment 14B is the method of embodiment 13B, wherein $R^1$ is an alkyl, fluorinated alkyl, aryl, fluorinated aryl, aralkyl, fluorinated aralkyl, alkaryl, or fluorinated alkaryl.

Embodiment 15B is the method of embodiment 13B or 14B, wherein $R^2$ is an alkoxy, aryloxy, alkaryloxy, aralkoxy, acyloxy, or halo.

Embodiment 16B is the method of embodiment 15B, wherein $R^2$ is an alkoxy or halo.

Embodiment 17B is the method of embodiment 16B, wherein $R^2$ is methoxy, ethoxy, propoxy, or chloro.

Embodiment 18B is the method of any one of embodiments 13B to 16B, wherein $R^3$ is hydrogen, alkyl, aryl, alkaryl, or aralkyl.

Embodiment 19B is the method of embodiment 18B, wherein $R^3$ is hydrogen or alkyl.

Embodiment 20B is the method of any one of embodiments 1B to 12B, wherein the surface treatment agent is of Formula (II).

$$(R^4)_3\text{—Si—NH—Si}(R^4)_3 \quad (II)$$

In Formula (II), $R^4$ is a hydrocarbon.

Embodiment 21B is the method of embodiment 20B, wherein $R^4$ is an alkyl.

Embodiment 22B is the method of embodiment 21B, wherein $R^4$ is methyl.

Embodiment 23B is the method of any one of embodiments 1B to 22B, wherein the porous siliceous material has pores and wherein at least 50 volume percent of the pores are mesopores.

Embodiment 24B is the method of embodiment 23B, wherein at least 60 volume percent, at least 70 volume percent, at least 80 volume percent, or at least 90 volume percent of the pores in the porous siliceous material are mesopores.

Embodiment 1C is a composite material. The composite material includes a) a precursor and b) a metal complex incorporated into the precursor that contains a reaction product of 1) a divalent metal and 2) at least one basic, nitrogen-containing compound. The precursor includes a reaction product of a mixture containing 1) a porous siliceous material and 2) a surface treatment agent. The porous siliceous material has mesopores. The surface treatment agent is added in an amount in a range of 0.1 to 4.5 mmoles of the surface treatment agent per gram of the porous siliceous material. The surface treatment agent is a silane of Formula (I), a disilazane of Formula (II), or a mixture of the silane of Formula (I) and the disilizane of Formula (II).

$$R^1\text{—Si}(R^2)_{3-x}(R^3)_x \quad (I)$$

$$(R^4)_3\text{—Si—NH—Si}(R^4)_3 \quad (II)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2. In Formula (II), each $R^4$ is a hydrocarbon group.

Embodiment 2C is the composite of embodiment 1C, wherein the composite further comprises divalent metal that is not in the form of the metal complex.

Embodiment 3C is the composite of embodiment 1C or 2C, wherein the total amount of divalent metal is in a range of 1 to 50 weight percent based on a total weight of the composite.

Embodiment 4C is the composite of any one of embodiments 1C to 3C, wherein the total amount of divalent metal is in a range of 5 to 50 weight percent based on the total weight of the sorbent.

Embodiment 5C is the composite of any one of embodiments 1C to 4C, wherein the basic, nitrogen-containing compound has a molecular weight no greater than 150 grams/mole.

Embodiment 6C is the composite of any one of embodiments 1C to 5C, wherein the basic, nitrogen-containing compound is ammonia, a hydrazine compound, an amine compound, or a nitrogen-containing heterocyclic compound.

Embodiment 7C is the composite of any one of embodiments 1C to 6C, wherein the divalent metal is from a Group 2 metal or a Group 6 to 12 metal of the IUPAC Periodic Table of Elements.

Embodiment 8C is the composite of any one of embodiments 1C to 7C, wherein the divalent metal is divalent zinc or copper.

Embodiment 9C is the composite of any one of embodiment 1C to 8C, wherein the composite further comprises an acid-base indicator.

Embodiment 10C is the composite of any one of embodiments 1C to 9C, wherein the porous siliceous material has a pore volume equal to at least 0.5 cm$^3$ per gram.

Embodiment 11C is the composite of any one of embodiments 1C to 10C, wherein the pore volume of the porous siliceous material is in a range of 0.5 to 1.0 cm$^3$ per gram.

Embodiment 12C is the composite of any one of embodiments 1C to 11C, wherein the BET specific surface area of the porous siliceous material is at least 50 m$^2$/gram.

Embodiment 13C is the composite of any one of embodiments 1C to 12C, wherein the BET specific surface area of the porous siliceous material is in a range of 50 to 1000 m$^2$/gram.

Embodiment 14C is the composite of any one of embodiments 1C to 13C, wherein the porous siliceous material is formed by hydrolysis of a tetraalkoxy silane, a trialkoxy silane, or a mixture thereof in the presence of an organic solvent.

Embodiment 15C is the composite of embodiment 14C, wherein the tetraalkoxy silane, the trialkoxy silane, or the mixture thereof is of Formula (III).

$$(R^5)_y\text{Si}(R^6)_{4-y} \quad (III)$$

In Formula (III), $R^5$ is an alkyl group or hydrogen; and $R^6$ is an alkoxy or halo group. The variable y is an integer equal to 0 or 1.

Embodiment 16C is the composite of any one of embodiments 1C to 15C, wherein the surface treatment agent is of Formula (I).

$$R^1\text{—Si}(R^2)_{3-x}(R^3)_x \quad (I)$$

In Formula (I), $R^1$ is a hydrocarbon or fluorinated hydrocarbon group, $R^2$ is a hydrolyzable group, $R^3$ is a non-hydrolyzable group, and x is an integer equal to 0, 1, or 2.

Embodiment 17C is the composite of embodiment 16C, wherein $R^1$ is an alkyl, fluorinated alkyl, aryl, fluorinated aryl, aralkyl, fluorinated aralkyl, alkaryl, or fluorinated alkaryl.

Embodiment 18C is the composite of embodiment 16C or 17C, wherein $R^2$ is an alkoxy, aryloxy, alkaryloxy, aralkoxy, acyloxy, or halo.

Embodiment 19C is the composite of embodiment 18C, wherein $R^2$ is an alkoxy or halo.

Embodiment 20C is the composite of embodiment 19C, wherein $R^2$ is methoxy, ethoxy, propoxy, or chloro.

Embodiment 21C is the composite of any one of embodiments 16C to 19C, wherein $R^3$ is hydrogen, alkyl, aryl, alkaryl, or aralkyl.

Embodiment 22C is the composite of embodiment 21C, wherein $R^3$ is hydrogen or alkyl.

Embodiment 23C is the composite of any one of embodiments 1C to 15C, wherein the surface treatment agent is of Formula (II).

$$(R^4)_3\text{—Si—NH—Si}(R^4)_3 \quad\quad (II)$$

In Formula (II), $R^4$ is a hydrocarbon.

Embodiment 24C is the composite of embodiment 23C, wherein $R^4$ is an alkyl.

Embodiment 25C is the composite of embodiment 24C, wherein $R^4$ is methyl.

Embodiment 26C is the composite of any one of embodiments 1C to 25C, wherein the porous siliceous material has pores and wherein at least 50 volume percent of the pores are mesopores.

Embodiment 27C is the composite of embodiment 26C, wherein at least 60 volume percent, at least 70 volume percent, at least 80 volume percent, or at least 90 volume percent of the pores in the porous siliceous material are mesopores.

Embodiment 1D is a method of capturing a basic, nitrogen-containing compound. The method includes providing a metal-containing sorbent according to any one of embodiment 1A to 24A. The method further includes exposing the metal-containing sorbent to a basic, nitrogen-containing compound to form a metal complex-containing composite.

EXAMPLES

TABLE 1

List of materials

| Chemical Name | Chemical Supplier |
| --- | --- |
| Tetraethyl orthosilicate (TEOS) | Sigma-Aldrich, Milwaukee, WI |
| Hydrogen chloride, HCl (1N) | J T Baker, Center Valley, PA |
| Ethanol (EtOH) | EMD Millipore, Darmstadt, Germany |
| Ammonium hydroxide (28 wt. % in $H_2O$) | EMD Millipore, Darmstadt, Germany |
| Trimethoxyphenylsilane (TMPS) | Sigma-Aldrich, Milwaukee, WI |
| Isooctyltrimethoxysilane (IOS) | Gelest, Morrisville, PA |
| Hexamethyldisilazane (HMDS) | Sigma-Aldrich, Milwaukee, WI |
| DAVISIL LC35A | W. R. Grace and Company, Columbia, MD |
| DAVASIL LC250A | W. R. Grace and Company, Columbia, MD |
| Zinc (II) chloride ($ZnCl_2$), anhydrous, 99.99% | Alfa Aesar, Ward Hill, MA |
| Nickel (II) chloride ($NiCl_2$), anhydrous, 98% | Alfa Aesar, Ward Hill, MA |
| Copper (II) chloride ($CuCl_2$), anhydrous, 98% | Alfa Aesar, Ward Hill, MA |
| Bromoxylenol blue | Sigma-Aldrich, Milwaukee, WI |
| Methyl Red, ACS | Alfa Aesar, Ward Hill, MA |

Ammonia Capacity Test

A simple flow-through custom built delivery system was used to deliver known concentrations of ammonia to the sample for measurement. Stainless steel tubing was used throughout the delivery system. Ammonia was delivered to the system from a dry 1% (10,000 ppm) certified ammonia in nitrogen pressurized gas cylinder (Oxygen Service Company, St. Paul, Minn.). The ammonia/nitrogen stream was further diluted with additional nitrogen by use of a series of digital mass flow controllers (available under the designation DFC26 from Aalborg, Orangeburg, N.Y.) to deliver a 1000 ppm stream of ammonia at a flow of 50 mL/minute to the testing tube. The digital mass flow controllers were calibrated by placing a Gilibrator-2 Primary Airflow Calibrator (Sensidyne, St. Petersburg, Fla.) at the output of each controller. The Gilibrator flow meter was used to measure a range of flows from each flow controller which was used to generate calibration curves. Using these calibrations curves, the mass flow controllers were set to deliver the desired ammonia concentration at the desired gas flow rate.

The ammonia removal capacity was determined by adding powdered particles of a sample as synthesized to a tared test tube (7 mm inner diameter) until the bed depth in the tube was 0.5 cm after being tamped. The mass of the sample was then determined by weighing the sample in the test tube. The test tube was then connected in line with the system, allowing the 1000 ppm ammonia gas stream to flow through the sample. To the downstream side of the test tube, tubing was connected that led to a gas chromatograph instrument (SRI 8610C, SRI Instruments, Torrance, Calif.). At the time the ammonia gas stream began to pass though the test sample, a timer was started. The SRI gas chromatograph then periodically sampled the gas stream and passed the sample through a 6'×⅛"×0.085" AT steel Alltech Chromosorb 103 80/100 column (Alltech Associates, Grace Davidson Discovery Sciences, Bannockburn, Ill.). The gas chromatograph instrument was equipped with a 10.6 eV lamp photoionization detector to detect ammonia in the effluent. It was observed that good detection of ammonia vapor was found when the gas chromatograph sampled the gas stream for 20 seconds, allowed the sample to pass through the column for 280 seconds and then allowed 60 seconds to flush out the sample before it drew in the next sample to be analyzed.

Prior to testing, a certified 57 ppm ammonia in nitrogen pressurized gas cylinder (Oxygen Services Company, St. Paul, Minn.) was used to calibrate the gas chromatograph software. The signal generated by this effluent was used to set the software to 50 ppm ammonia. The end point of the ammonia vapor test, and thus the service life, was defined as the time point at which the ammonia effluent passing through the bed of copolymer produced a signal on the PID detector that exceeded that of the signal calibrated for 50 ppm. The performance of each test material was reported as the number of minutes until 50 ppm breakthrough was observed performing the test as described above. In addition, the area under the curve of the breakthrough plot until 50 ppm breakthrough coupled with the known mass of the test material used in this fixed volume test was used to calculate a mmoles/gram capacity for each test material using a sum of least squares equation.

Gas Sorption Analysis

Porosity and gas sorption experiments were performed using a Quantachrome Autosorb iQ Automated Surface Area and Pore Size Analyzer using adsorbates of ultra-high purity nitrogen. The software ASiQWin was used for data acquisition and analysis. The following method was followed for the characterization of the porosity and surface area within the exemplified materials. In a sample tube, 150-300 milligrams of material was degassed at room temperature under ultra-high vacuum <7 mTorr to remove residual solvent and other adsorbates, with leak test performed to make sure leak rate slower than 2 mTorr/min. The degas procedure for materials was over 24 hours at room temperature. Nitrogen sorption isotherms at 77° K were obtained using in the relative pressure (p/p°) range from a p/p° from 0.001 to 0.995 for adsorption and in the range of 0.995 back to 0.05 for desorption with programed tolerance and equilibrium settings. Helium was used for the void volume measurement, both at ambient temperature and at 77° K. BET specific surface areas (SABET) were calculated from nitrogen adsorption data by multipoint Brunauer-Emmett-Teller (BET) analysis. Average pore sizes and total pore volume (pore size typically up to approximately 200-300 nm) were calculated by last adsorption point in the isotherm at p/p° equal to approximately 0.995. Density Functional Theory (DFT) was used for pore size distribution analysis.

Figure 2:
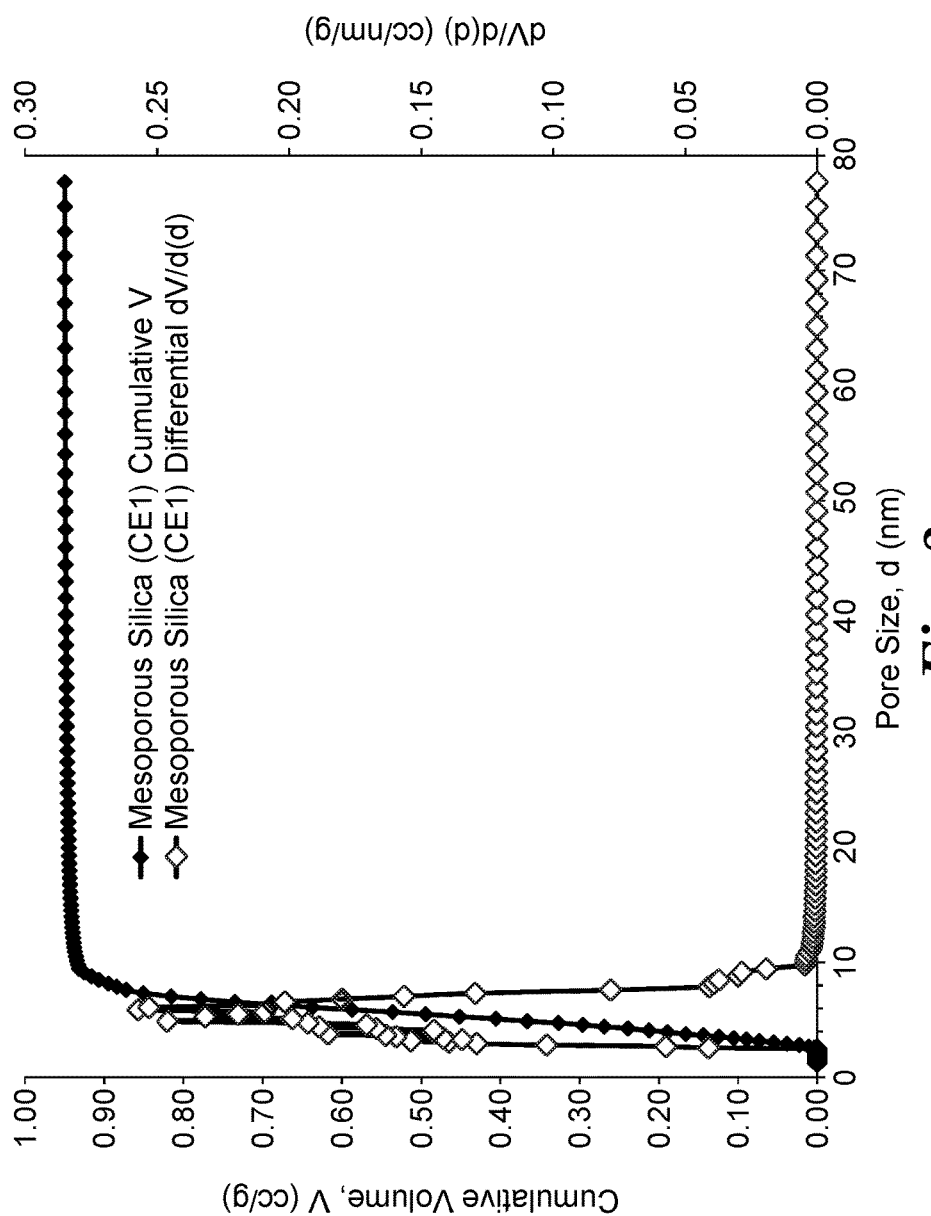
FIG. 2 is a plot showing the cumulative pore volume and the pore size distribution calculated by non-local density functional theory for an exemplary porous siliceous material.

The pore size distribution can be described as shown in FIG. 2. This figure shows two plots. The first plot is the cumulative pore volume and the second plot is the derivative of the cumulative pore volume. In both of these plots, the x-axis is the diameter of the pore.

To calculate the volume percent of the pores falling in the mesopores size region (having a diameter in the range of 2 nanometers to 50 nanometers), the cumulative pore volume plot is used. First of all, the maximum cumulative pore volume (Max CPV) is determined. This corresponds to where the plot levels off at the upper pore sizes. Next, the cumulative pore volume is determined for pores having a size less than or equal to 2 nanometers (CPV at 2 nm) and for pores having a size less than or equal to 50 nanometers. The percent pore volume in the mesoporous range is then calculated using the following equation.

100[(CPV at 50 nm)−(CPV at 2 nm)]÷(Max CPV)= Percent volume of mesopores

To calculate the average pore diameter, the maximum pore volume (Max CPV) is determined and then divided by 2. This corresponds to 50 percent of the maximum pore volume (50% Max CPV). The pore size associated with 50% Max CPV is determined from the cumulative pore volume plot.

To calculate the pore size distribution, the derivative of the cumulative pore volume with respect to pore diameter is used. The pore size distribution is the size range associated with that portion of the derivative curve that is above the baseline.

Comparative Examples 1-4 and Examples 1-5

The following procedure was used to synthesize porous siliceous material, which was Comparative Example 1 (CE 1). The terms "porous silica", "porous siliceous material", "siliceous material", and "silica" are used interchangeably. The siliceous material of CE 1 was used as the base material for many of the Examples and other Comparative Examples contained herein. In a 1.0 L bottle equipped with a magnetic stir bar, 360 mL of ethanol (EtOH), 180 mL of tetraethyl orthosilicate (TEOS), and 30 mL of 0.01 M aqueous HCl solution were mixed. This mixture was stirred at room temperature for 18 hours. 5 mL of ammonium hydroxide diluted with 45 mL deionized water was added to the mixture to bring the pH of the mixture above 7. A gel formed within minutes. This gel was dried in a solvent oven at 90° C. for 1 hour and then at 130° C. for 2 hours. This porous silica had a $SA_{BET}$ (i.e., BET Specific Surface Area) of 970 m²/gram, an average pore size of 4.1 nm and a total pore volume of 0.99 cm³/gram as determined by nitrogen adsorption. Without further chemical modification, the porous silica was ground with a mortar and pestle to form a powdered material, which was CE 1. The powdered sample was tested for ammonia capacity. The number of minutes until ammonia breakthrough and the calculated capacity in mmoles ammonia adsorbed per gram sample (at 50 ppm ammonia breakthrough) were determined. The results are shown in Table 3.

FIG. 1 is a plot of the nitrogen adsorption and desorption isotherms at 77° K and at relative pressures up to 0.98±0.01 for the porous siliceous material CE 1. The adsorption isotherm of the sample indicates that there is considerable adsorption at relative pressures below 0.1, which suggests that micropores are present. There is a gradual increase in adsorption at relative pressures between 0.1 and about 0.95. This increase is indicative of a wide size distribution of mesopores. Additionally, the hysteresis in the nitrogen desorption isotherm compared to the nitrogen adsorption isotherm is a further indication of the presence of mesopores. FIG. 2 is a plot showing the cumulative pore volume and the pore size distribution for the porous silica sorbent material CE 1. The pore sizes in FIG. 2 was calculated by non-local density functional theory. The pores have a diameter in a range from 2.3 nm to 10 nm indicating the presence of mesopores. The volume percent of the pores that are in the mesoporous size range is nearly 100 percent.

Comparative Examples 2-4 and Examples 1-5 were prepared using the same porous silica described in CE 1, with additional treatment using various amount of a surface treatment agent (isooctyltrimethoxysilane (IOS)) and/or with incorporation (i.e., impregnation) of a divalent metal salt (zinc (II) chloride ($ZnCl_2$)). Table 2 shows the molar concentration of $ZnCl_2$ in the impregnant bath and the amount of IOS (in units of mmoles silane per gram silica as well as μmoles silane per surface area (m²) of silica) used to prepare Comparative Examples 1-4 and Examples 1-5. The preparation of Comparative Examples 2-4 and Examples 1-5 is further described below.

TABLE 2

Summary of conditions used to prepare Comparative Examples 1-4 and Examples 1-5.

| Sample | $ZnCl_2$ Concentration in Preparation | IOS Concentration (mmol silane/ gram silica) | Silica Surface Area (m²/g) | IOS Concentration (μmol silane/ m² silica) |
|---|---|---|---|---|
| CE 1 | 0 | 0 | 970 | 0 |
| CE 2 | 0 | 1.82 | 970 | 1.86 |
| CE 3 | 6M | 0 | 970 | 0 |
| Ex 1 | 6M | 0.46 | 970 | 0.47 |
| Ex 2 | 6M | 1.11 | 970 | 1.16 |
| Ex 3 | 6M | 1.82 | 970 | 1.86 |
| Ex 4 | 6M | 2.79 | 970 | 2.79 |
| Ex 5 | 6M | 3.65 | 970 | 3.72 |
| CE 4 | 6M | 4.56 | 970 | 4.65 |

Comparative Example 2 was prepared by treating porous silica (CE 1) with a silane surface treatment agent, IOS. More specifically, 3.0 grams of porous silica (CE 1) were suspended in 25 mL of deionized water. Separately, an ethanolic solution of IOS was prepared by dissolving 0.32 grams of IOS in 5 mL of ethanol. The ethanolic IOS solution was added to the aqueous suspension containing the porous silica of CE 1. To this mixture was added 0.2 mL of ammonium hydroxide. The mixture was stirred at 75° C. for 16 hours. The resulting material was isolated by filtration through filter paper without additional rinsing and dried in a solvent oven at 90° C. for 1 hour and then at 130° C. for 2 hours. After drying, a powdered sample was obtained and tested for ammonia capacity. The number of minutes until ammonia breakthrough and the calculated capacity in mmoles ammonia adsorbed per gram sample (at 50 ppm ammonia breakthrough) were determined. The results are shown in Table 3.

Comparative Example 3 was prepared with a metal salt impregnant but no silane surface treatment agent using the following procedure. In a 100 mL glass bottle, 40.8 grams of $ZnCl_2$ was dissolved in 50 mL of deionized water. To this solution was added 5.0 grams of the porous silica (refer to CE 1 above). The mixture was stirred overnight at room temperature. The solid was isolated by vacuum filtration and dried in a solvent oven at 90° C. for 1 hour and then at 130° C. for 2 hours. After drying, a powdered sample was obtained. The sample was evaluated using the ammonia capacity test, as described above. The number of minutes until ammonia breakthrough and the calculated capacity in mmoles ammonia adsorbed per gram sample (at 50 ppm ammonia breakthrough) were determined. The results are shown in Table 3.

Examples 1-5 and Comparative Example 4 were prepared by first treating aqueous suspensions of porous silica (refer to CE 1 above) with ethanolic solutions of varying concentrations of IOS followed by addition of $ZnCl_2$. More specifically, in six separate 100 mL bottles, 3.0 grams of the porous siliceous material were suspended in 25 mL of deionized water. Separately, ethanolic solutions of IOS were prepared by dissolving 0.32 grams, 0.80 grams, 1.28 grams, 1.92 grams, 2.56 grams or 3.20 grams of IOS in 5 mL of ethanol for Examples 1-5 and Comparative Example 4, respectively. An ethanolic IOS solution was added to each aqueous suspension containing the porous siliceous material. To each mixture was added 0.2 mL of ammonium hydroxide. Each mixture was stirred at 75° C. for 16 hours. To each mixture 24.5 grams of $ZnCl_2$ was rapidly added followed by stirring for 24 hours at room temperature. The resulting material was isolated by filtration through filter paper without additional rinsing and dried in a solvent oven at 90° C. for 1 hour followed by 130° C. for 2 hours. After drying, powdered samples were obtained. Each powdered sample was evaluated using the ammonia capacity test, as described above. The number of minutes until ammonia breakthrough and the calculated capacity in mmoles ammonia adsorbed per gram sample (at 50 ppm ammonia breakthrough) were determined. The results are shown in Table 3.

TABLE 3

Ammonia filtration performance of Comparative Examples 1-4 and Examples 1-5.

| Sample | Minutes Until 50 ppm Ammonia Breakthrough | Ammonia Capacity (mmol ammonia/gram sample) |
| --- | --- | --- |
| CE 1 | 10.0 | 0.33 |
| CE 2 | 15.0 | 0.65 |
| CE 3 | 76.7 | 1.31 |
| Ex 1 | 174.7 | 2.52 |
| Ex 2 | 246.5 | 4.94 |
| Ex 3 | 322.3 | 4.30 |
| Ex 4 | 142.7 | 2.84 |
| Ex 5 | 148.5 | 2.64 |
| CE 4 | 59.0 | 1.40 |

The concentration of zinc was measured for samples CE 1, CE 3 and Ex 1 by inductively coupled plasma atomic emission spectroscopy (ICP-AES). The weight percent of zinc relative to the total sorbent material in these samples were 0.0 wt. %, 16.7 wt. % and 16.7 wt. % for CE 1, CE 3 and Ex 1, respectively.

Examples 6-7

Examples 6 and 7 were prepared by first treating aqueous suspensions of the above described porous silica (CE 1) with ethanolic solutions of trimethoxyphenylsilane (TMPS) and hexamethyldisilazane (HMDS), respectively. Each sample was then impregnated with $ZnCl_2$.

The following procedure was used to prepare Example 6. In a 100 mL bottle, 3.0 grams of the porous silica were suspended in 25 mL of deionized water. Separately, an ethanolic solution of TMPS was prepared by dissolving 0.27 grams of TMPS in 5 mL of ethanol. The TMPS ethanolic solution was added to the aqueous suspension containing the porous silica. To this mixture was added 0.2 mL of ammonium hydroxide. The mixture was stirred at 75° C. for 16 hours. To this mixture 24.5 grams of $ZnCl_2$ was rapidly added followed by stirring for 24 hours at room temperature. The solid was isolated by filtration and dried in a solvent oven at 90° C. for 1 hour and then at 130° C. for 2 hours.

The following procedure was used to prepare Example 7. In a 100 mL bottle, 3.0 grams of the porous silica (CE 1) were suspended in 25 mL of deionized water. Separately, an ethanolic solution of HMDS was prepared by dissolving 0.11 grams of HMDS in 5 mL of ethanol. The HMDS ethanolic solution was added to the aqueous suspension containing the porous silica. To this mixture was added 0.2 mL of ammonium hydroxide. The mixture was stirred at 75° C. for 16 hours. To this mixture 24.5 grams of $ZnCl_2$ was rapidly added and stirred for 24 hours at room temperature. The solid was isolated by vacuum filtration and dried in a solvent oven at 90° C. for 1 hour and then at 130° C. for 2 hours.

The concentration of $ZnCl_2$, the type of surface treatment agent, and the amount of the surface treatment agent (given in units of mmole silane per gram silica and in units of µmol silane per surface area ($m^2$) of silica) used to prepare Examples 6 and 7 are shown in Table 4.

Powdered samples of Examples 6 and 7 were evaluated using the ammonia capacity test described above. The number of minutes until ammonia breakthrough and the calculated capacity in mmoles ammonia adsorbed per gram sample (at 50 ppm ammonia breakthrough) were determined. The results are shown in Table 5.

TABLE 4

Summary of conditions used to prepare Examples 6-7.

| Example | $ZnCl_2$ Concentration in Preparation | Surface Treatment Agent | Surface Treatment Agent Concentration (mmol/gram silica) | Silica Surface Area ($m^2$/g) | Surface Treatment Agent Concentration (µmol silane/ $m^2$ silica) |
| --- | --- | --- | --- | --- | --- |
| Ex 6 | 6M | TMPS | 0.46 | 970 | 0.47 |
| Ex 7 | 6M | HMDS | 0.46 | 970 | 0.47 |

TABLE 5

Ammonia filtration performance of Examples 6-7.

| Example | Minutes Until 50 ppm Ammonia Breakthrough | Ammonia Capacity (mmol ammonia/gram sorbent) |
|---|---|---|
| Ex 6 | 185.5 | 3.03 |
| Ex 7 | 163.7 | 3.33 |

Examples 8-9

Examples 8 and 9 were prepared by first treating aqueous suspensions of the above described porous silica (CE 1) with an ethanolic solution of IOS. The samples were then impregnated with $ZnCl_2$ at concentrations of 1.0 M and 10.0 M, respectively.

The following procedure was used to prepare Example 8. In a 100 mL bottle, 3.0 grams of the porous silica were suspended in 25 mL of deionized water. Separately, an ethanolic solution of IOS was prepared by dissolving 0.32 grams of IOS in 5 mL of ethanol. The IOS ethanolic solution was added to the aqueous suspension containing the porous silica. To this mixture was added 0.2 mL of ammonium hydroxide. The mixture was stirred at 75° C. for 16 hours. To this mixture was added 4.1 grams of $ZnCl_2$ and the resulting mixture was stirred for 24 hours at room temperature. The solid was isolated by vacuum filtration and dried in a solvent oven at 90° C. for 1 hour and then at 130° C. for 2 hours.

The following procedure was used to prepare Example 9. In a 100 mL bottle, 3.0 grams of the porous silica were suspended in 25 mL of deionized water. Separately, an ethanolic solution of IOS was prepared by dissolving 0.32 grams of IOS in 5 mL of ethanol. The IOS ethanolic solution was added to the aqueous suspension containing the porous silica. To this mixture was added 0.2 mL of ammonium hydroxide. The mixture was stirred at 75° C. for 16 hours. To this mixture 40.8 grams of $ZnCl_2$ was rapidly added followed by stirring for 24 hours at room temperature. The solid was isolated by vacuum filtration and dried in a solvent oven at 90° C. for 1 hour and then at 130° C. for 2 hours.

The concentration of $ZnCl_2$, the type of surface treatment agent, and the amount of the surface treatment agent (given in units of mmole silane per gram silica and in units of μmol silane per surface area ($m^2$) of silica) used to prepare Examples 8 and 9 are shown in Table 6.

Powdered samples of Examples 8 and 9 were evaluated using the ammonia capacity test described above. The number of minutes until ammonia breakthrough and the calculated capacity in mmoles ammonia adsorbed per gram sample (at 50 ppm ammonia breakthrough) were determined. The results are shown in Table 7.

TABLE 6

Summary of conditions used to prepare Examples 8-9.

| Example | $ZnCl_2$ Concentration in Preparation | Surface Treatment Agent | Surface Treatment Agent Concentration (mmol/gram silica) | Silica Surface Area ($m^2/g$) | IOS Concentration (μmol silane/ $m^2$ silica) |
|---|---|---|---|---|---|
| Ex 8 | 1M | IOS | 0.46 | 970 | 0.47 |
| Ex 9 | 10M | IOS | 0.46 | 970 | 0.47 |

TABLE 7

Ammonia filtration performance for Examples 8-9.

| Example | Minutes Until 50 ppm Ammonia Breakthrough | Ammonia Capacity (mmol ammonia/gram sorbent) |
|---|---|---|
| Ex 8 | 148 | 2.21 |
| Ex 9 | 211 | 3.37 |

Examples 10-11

Examples 10 and 11 were impregnated with methyl red and bromoxylenol blue, respectively. The following procedure was used to prepare Examples 10 and 11.

In a 100 mL bottle, 30 mg of dye was added to 25 mL deionized $H_2O$. Each solution was filtered through a 0.45 μm syringe filter, and 3 grams porous silica (CE 1) were added to the $H_2O$ dye. An ethanolic solution of IOS was separately prepared by dissolving 1.28 grams of IOS in 5 mL of ethanol. The IOS ethanolic solution was added to the aqueous suspension containing the porous silica. To this mixture was added 0.2 mL of ammonium hydroxide. The mixture was stirred at 75° C. for 16 hours. To this mixture was added 40.8 grams of $ZnCl_2$. The mixture was stirred for 24 hours at room temperature. The solid was isolated by vacuum filtration and dried in a solvent oven at 90° C. for 1 hour and then at 130° C. for 2 hours.

The dye-impregnated materials of Examples 10 and 11 demonstrated visible color as synthesized. A small amount (approximately 0.1 grams) of each dye-impregnated material was spread onto wax paper and a drop of aqueous ammonia was applied. Both materials responded with a visible change in color as noted in Table 8.

TABLE 8

Dye impregnant and color for Examples 10-11.

| Example | Dye | Color As Synthesized | Color After Ammonia Introduction |
|---|---|---|---|
| Ex 10 | Methyl Red | Pink | White |
| Ex 11 | Bromoxylenol Blue | Orange | Blue |

Comparative Examples 5-6 and Examples 12-13

Two commercially available porous silica samples with average pore diameters of 3.4 nm and 25 nm were treated with hydrophobic silane (IOS) and impregnated with $ZnCl_2$. These porous silica samples have trade names DAVISIL LC35A and DAVISIL LC250A from W. R. Grace and Company. The technical data sheet for DAVISIL LC35A states a surface area of 700 m²/g and an average pore diameter of 3.5 nm. The technical data sheet for DAVISIL LC250A states a surface area of 285 m²/g and an average pore diameter of 25 nm.

CE 5 and CE 6 were prepared in the same manner as CE 3 (i.e., without any silane added), except the porous silica used was DAVISIL LC35A and DAVISIL LC250A, respectively. Ex 12 and Ex 13 followed the same procedure as Ex 1, except the porous silicas used were DAVISIL LC35A and DAVISIL LC250A, and the amount of silane was scaled with the surface area of the particles as described by the technical datasheet.

The porous silica, the concentration of $ZnCl_2$, the type of surface treatment agent, and the amount of the surface treatment agent (given in units of mmole silane per gram silica and in units of μmol silane per surface area (m²) of silica) used to prepare Comparative Examples 5-6 and Examples 12-13 are shown in Table 9.

Powdered samples of Comparative Examples 5-6 and Examples 12-13 were evaluated using the ammonia capacity test described above. The number of minutes until ammonia breakthrough and the calculated capacity in mmoles ammonia adsorbed per gram sample (at 50 ppm ammonia breakthrough) were determined. The results are shown in Table 10.

rately, ethanolic solutions of IOS were prepared by dissolving 0.32 grams IOS into 5 mL ethanol. The ethanolic IOS solution was added to each aqueous suspension containing the porous silica. To each mixture was added 0.2 mL of ammonium hydroxide. The mixture was stirred at 75° C. for 16 hours. To each mixture was added $CuCl_2$ (24.5 g), $MgCl_2$ (17.3 g), or and $NiCl_2$ (23.6 g) to form Examples 14-16, respectively. Each mixture was then stirred for 24 hours at room temperature. The resulting material was isolated by filtration through filter paper without additional rinsing and dried in a solvent oven at 90° C. for 1 hour and then at 130° C. for 2 hours. After drying, powdered samples were obtained. Conditions for preparation of Examples 14-16 are shown in Table 11.

Powdered samples of Examples 14-16 were evaluated using the ammonia capacity test described above. The number of minutes until ammonia breakthrough and the calculated capacity in mmoles ammonia adsorbed per gram sample (at 50 ppm ammonia breakthrough) were determined. The results are shown in Table 12.

TABLE 9

Summary of conditions used to prepare Comparative Examples 5-6 and Examples 12-13.

| Example | Porous Silica | $ZnCl_2$ Concentration in Preparation | Surface Treatment Agent | Surface Treatment Agent Concentration (mmol/gram silica) | Silica Surface Area (m²/g) | Surface Chemistry Concentration (μmoles/m² silica) |
|---|---|---|---|---|---|---|
| CE 5 | DAVISIL C35A | 6M | None | 0 | 700 | 0 |
| CE 6 | DAVISIL LC250A | 6M | None | 0 | 285 | 0 |
| Ex 12 | DAVISIL LC35A | 6M | IOS | 0.32 | 700 | 0.47 |
| Ex 13 | DAVISIL LC250A | 6M | IOS | 0.13 | 285 | 0.47 |

TABLE 10

Ammonia filtration performance for Comparative Examples 5-6 and Examples 12-13.

| Example | Minutes Until 50 ppm Ammonia Breakthrough | Ammonia Capacity (mmol ammonia/gram sample) |
|---|---|---|
| CE 5 | 147.0 | 2.37 |
| CE 6 | 184.0 | 3.08 |
| Ex 12 | 179.3 | 2.75 |
| Ex 13 | 202.3 | 3.80 |

Examples 14-16

Examples 14-16 were prepared by first treating aqueous suspensions of the above described porous silica (CE 1) with ethanolic solutions of varying concentrations of isooctyltrimethoxysilane (IOS) followed by addition of divalent metal chlorides.

In three separate 100 mL bottles, 3.0 grams of the porous silica were suspended in 25 mL of deionized water. Sepa-

TABLE 11

Summary of conditions used to prepare Examples 14-16.

| Example | Metal Salt | Surface Treatment Agent Concentration (mmol/gram silica) | Silica Surface Area (m²/g) | IOS Concentration (μmol silane/ m² silica) |
|---|---|---|---|---|
| Ex 14 | 6M $CuCl_2$ | 0.46 | 970 | 0.47 |
| Ex 15 | 6M $MgCl_2$ | 0.46 | 970 | 0.47 |
| Ex 16 | 6M $NiCl_2$ | 0.46 | 970 | 0.47 |

TABLE 12

Ammonia filtration performance for Examples 14-16.

| Example | Minutes Until 50 ppm Ammonia Breakthrough | Ammonia Capacity (mmoles/gram) |
|---|---|---|
| Ex 14 | 41.3 | 1.18 |
| Ex 15 | 40.7 | 0.83 |
| Ex 16 | 58.0 | 1.29 |

We claim:

1. A metal-containing sorbent comprising:
   a) a precursor comprising a reaction product of a mixture comprising
      1) a porous siliceous material having mesopores; and
      2) a surface treatment agent in an amount in a range of 0.1 to 4.5 mmoles per gram of the porous siliceous material, the surface treatment agent comprising
         (a) a silane of Formula (I)

$$R^1—Si(R^2)_{3-x}(R^3)_x \quad (I)$$

wherein
            $R^1$ is a hydrocarbon or fluorinated hydrocarbon group;
            $R^2$ is a hydrolyzable group;
            $R^3$ is a non-hydrolyzable group;
            x in an integer equal to 0, 1, or 2; or
         (b) a disilazane of Formula (II)

$$(R^4)_3—Si—NH—Si(R^4)_3 \quad (II)$$

wherein each $R^4$ is a hydrocarbon group; or
         (c) a mixture of the silane of Formula (I) and the disilazane of Formula (II); and
   b) a divalent metal incorporated into the precursor in an amount equal to at least 54 weight percent based on the total weight of the sorbent.

2. The metal-containing sorbent of claim 1, wherein the porous siliceous material has pores and wherein at least 50 volume percent of the pores are mesopores.

3. The metal-containing sorbent of claim 1, wherein the amount of the divalent metal incorporated into the precursor is in a range of 54- to 50 weight percent based on the total weight of the sorbent.

4. The metal-containing sorbent of claim 1, wherein the divalent metal is from a Group 2 metal or a Group 6 to 12 metal of the IUPAC Periodic Table of Elements.

5. The metal-containing sorbent of claim 1, wherein the divalent metal is divalent zinc or copper.

6. The metal-containing sorbent of claim 1, wherein the sorbent further comprises an acid-base indicator incorporated into the precursor.

7. A composite comprising:
   a) a precursor comprising a reaction product of a mixture comprising
      1) a porous siliceous material having mesopores; and
      2) a surface treatment agent in an amount in a range of 0.1 to 4.5 mmoles per gram of the porous siliceous material, the surface treatment agent comprising
         (a) a silane of Formula (I)

$$R^1—Si(R^2)_{3-x}(R^3)_x \quad (I)$$

wherein
            $R^1$ is a hydrocarbon or fluorinated hydrocarbon group;
            $R^2$ is a hydrolyzable group;
            $R^3$ is a non-hydrolyzable group;
            x is an integer equal to 0, 1, or 2; or
         (b) a disilazane of Formula (II)

$$(R^4)_3—Si—NH—Si(R^4)_3 \quad (II)$$

wherein each $R^4$ is a hydrocarbon group; or
         (c) a mixture of the silane of Formula (I) and the disilazane of Formula (II); and
   b) a metal complex incorporated into the precursor, wherein the metal complex comprises a reaction product of
      1) a divalent metal; and
      2) at least one basic, nitrogen-containing compound,
      wherein the divalent metal is present in an amount equal to at least 5 weight percent based on a total weight of the composite.

8. The composite of claim 7, wherein the porous siliceous material has pores and wherein at least 50 volume percent of the pores are mesopores.

9. The composite of claim 7, wherein the composite further comprises divalent metal that is not in the form of the metal complex.

10. The composite of claim 7, wherein the total amount of divalent metal is in a range of 5 to 50 weight percent based on a total weight of the composite.

11. The composite of claim 7, wherein the basic, nitrogen-containing compound has a molecular weight no greater than 150 grams/mole.

12. The composite of claim 7, wherein the basic, nitrogen-containing compound is ammonia, a hydrazine compound, an amine compound, or a nitrogen-containing heterocyclic compound.

13. A method of capturing a basic, nitrogen-containing compound, the method comprising:
    a) providing a metal-containing sorbent according to claim 1; and
    b) exposing the metal-containing sorbent to a basic, nitrogen-containing compound to form a metal complex-containing composite.

14. A method of preparing a metal-containing sorbent, the method comprising:
    a) providing a porous siliceous material having mesopores;
    b) treating the porous siliceous material with a surface treatment agent to form a precursor, wherein treating comprises adding 0.1 to 4.5 mmoles of the surface treatment agent per gram of the porous siliceous material, the surface treatment agent comprising
       1) a silane of Formula (I)

$$R^1—Si(R^2)_{3-x}(R^3)_x \quad (I)$$

wherein
          $R^1$ is a hydrocarbon or fluorinated hydrocarbon group;
          $R^2$ is a hydrolyzable group;
          $R^3$ is a non-hydrolyzable group;
          x is an integer equal to 0, 1, or 2; or
       2) a disilazane of Formula (II)

$$(R^4)_3—Si—NH—Si(R^4)_3 \quad (II)$$

wherein each $R^4$ is a hydrocarbon group; or
       3) a mixture of the silane of Formula (I) and the disilazane of Formula (II); and
    c) incorporating a divalent metal into the precursor to form the metal-containing sorbent, wherein the divalent metal is incorporated in an amount equal to at least 5 weight percent based on the total weight of the sorbent.

15. The method of claim 14, wherein the porous siliceous material has pores and wherein at least 50 volume percent of the pores are mesopores.

* * * * *

UNITED STATES PATENT AND TRADEMARK OFFICE
CERTIFICATE OF CORRECTION

PATENT NO. : 10,434,493 B2
APPLICATION NO. : 15/781518
DATED : October 8, 2019
INVENTOR(S) : Michael S. Wendland et al.

It is certified that error appears in the above-identified patent and that said Letters Patent is hereby corrected as shown below:

In the Specification

<u>Column 26</u>
Line 22, Delete "hexamethyldisilizane" and insert -- hexamethyldisilazane --, therefor.

<u>Column 30</u>
Line 9, Delete "or and" and insert -- and/or --, therefor.

In the Claims

<u>Column 31</u>
Line 17, In Claim 1, delete "in" and insert -- is --, therefor.
Line 25, In Claim 1, delete "54" and insert -- 5 --, therefor.
Line 32, In Claim 3, delete "54-" and insert -- 5 --, therefor.

Signed and Sealed this
Twenty-fourth Day of December, 2019

Andrei Iancu
*Director of the United States Patent and Trademark Office*